United States Patent [19]
Gersdorff et al.

[11] Patent Number: 5,182,642
[45] Date of Patent: Jan. 26, 1993

[54] APPARATUS AND METHOD FOR THE COMPRESSION AND TRANSMISSION OF MULTIFORMAT DATA

[75] Inventors: Detlef G. Gersdorff, Sterling Heights; John J. Giganti, Allenton; Phillip W. McCown; Timothy A. Sullivan, both of Sterling Heights, all of Mich.

[73] Assignee: General Dynamics Lands Systems Inc., Warren, Mich.

[21] Appl. No.: 687,986

[22] Filed: Apr. 19, 1991

[51] Int. Cl.$^5$ .............................................. H04N 7/12
[52] U.S. Cl. ..................................... 358/133; 358/142
[58] Field of Search ................. 358/141, 142, 133, 12, 358/135, 13, 11, 136; 325/28

[56] References Cited

U.S. PATENT DOCUMENTS

| | | | |
|---|---|---|---|
| 4,196,448 | 4/1980 | Whitehouse et al. | 375/28 X |
| 4,652,903 | 3/1987 | Lucas | 358/11 |
| 4,868,653 | 9/1989 | Golin et al. | 358/133 |
| 4,967,272 | 10/1990 | Kao et al. | 358/135 |
| 4,982,283 | 1/1991 | Acampora | 358/133 |

*Primary Examiner*—Victor R. Kostak
*Attorney, Agent, or Firm*—Brooks & Kushman

[57] ABSTRACT

Video data is compressed, at a first site, by a transform scaling data compressor (12), and carrier signals are modulated with audio and digital data by a delta modulation data modulator (14) and a delta-sigma modulation data modulator (16) respectively. Their output signals are combined by a multichannel data compressor (18) and transmitted to a second site, where the procedures are essentially reversed to effectively regenerate the data as originally formatted.

92 Claims, 12 Drawing Sheets

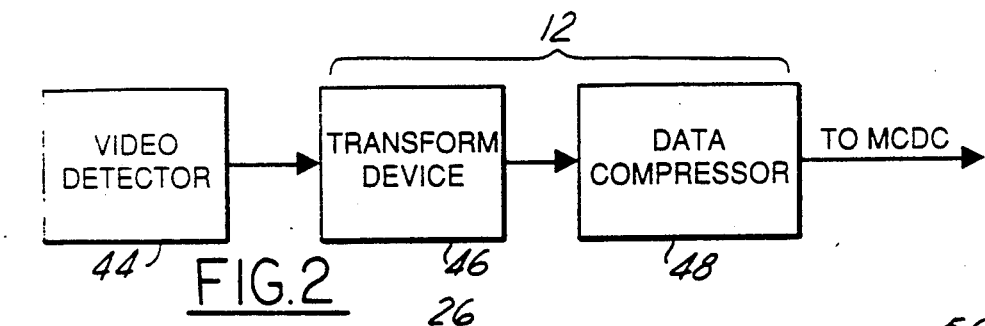
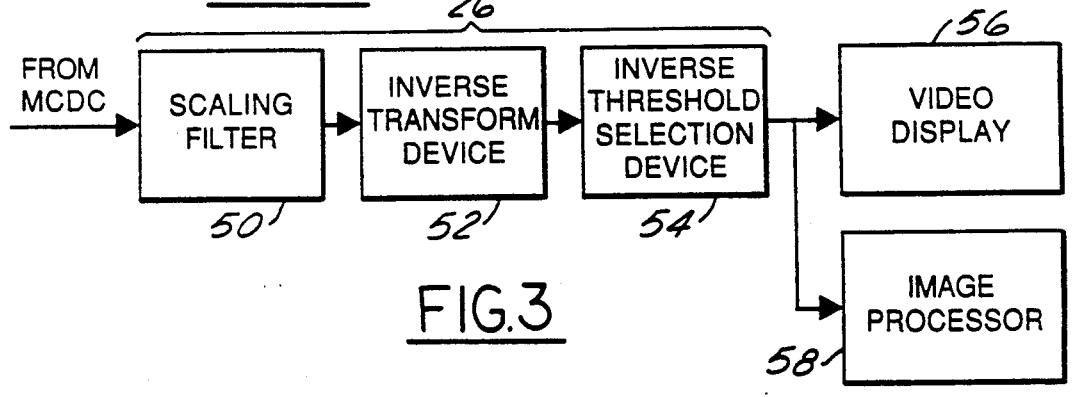
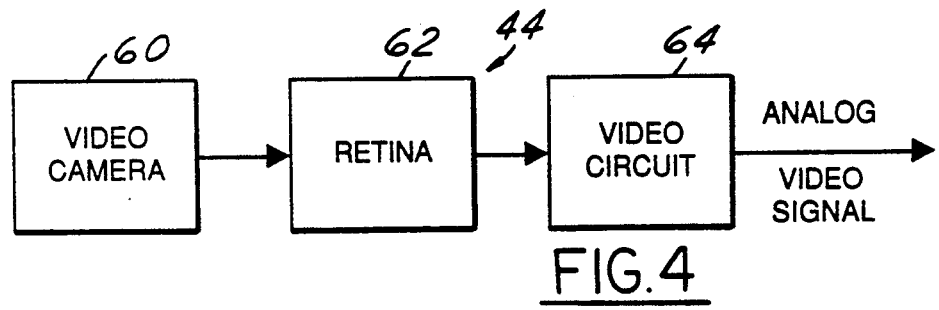
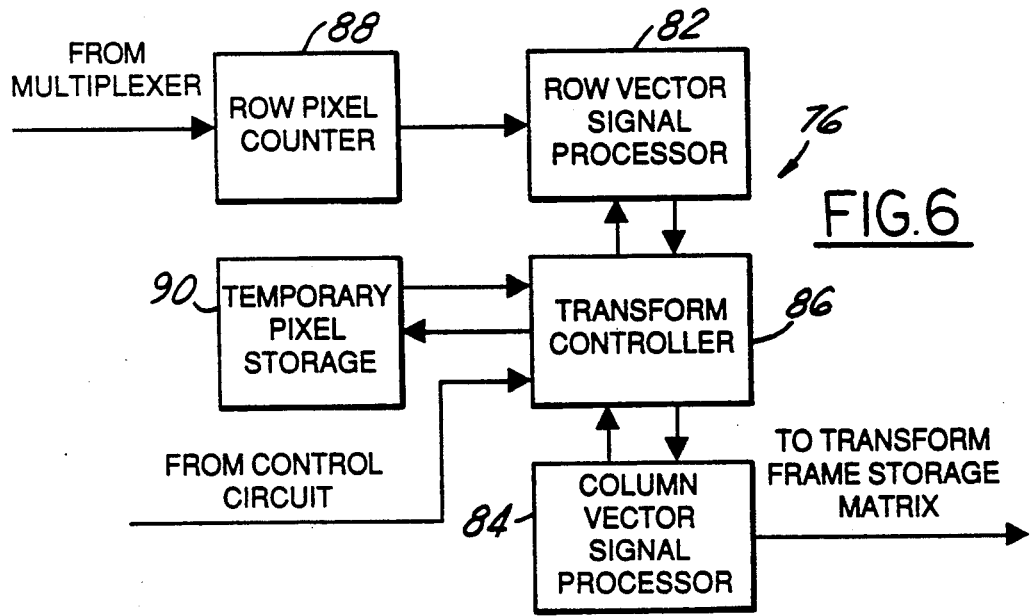

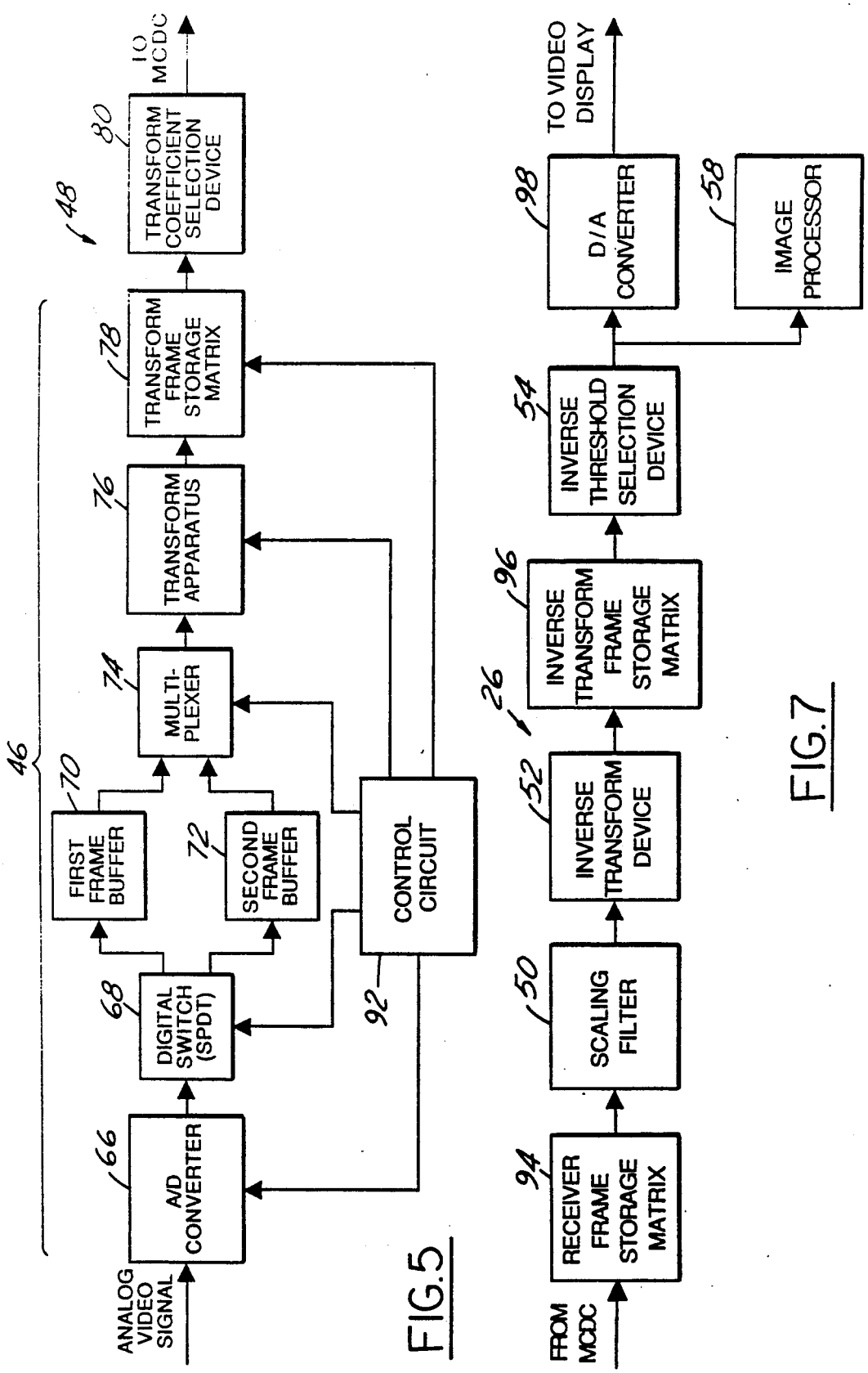

FIG.8

| 0.3 | 0.3 | 0.3 | 0.3 | 0.3 | 0.3 | 0.3 | 0.3 |
|---|---|---|---|---|---|---|---|
| 0.3 | 1.2 | 1.2 | 1.2 | 1.2 | 1.2 | 1.2 | 0.3 |
| 0.3 | 1.2 | 2.4 | 2.4 | 2.4 | 2.4 | 1.2 | 0.3 |
| 0.3 | 1.2 | 2.4 | 4.8 | 4.8 | 2.4 | 1.2 | 0.3 |
| 0.3 | 1.2 | 2.4 | 4.8 | 4.8 | 2.4 | 1.2 | 0.3 |
| 0.3 | 1.2 | 2.4 | 2.4 | 2.4 | 2.4 | 1.2 | 0.3 |
| 0.3 | 1.2 | 1.2 | 1.2 | 1.2 | 1.2 | 1.2 | 0.3 |
| 0.3 | 0.3 | 0.3 | 0.3 | 0.3 | 0.3 | 0.3 | 0.3 |

FIG.9

| 1 | 1 | 1 | 1 | 1 | 1 | 1 | 1 |
|---|---|---|---|---|---|---|---|
| 1 | 4 | 4 | 4 | 4 | 4 | 4 | 1 |
| 1 | 4 | 8 | 8 | 8 | 8 | 4 | 1 |
| 1 | 4 | 8 | 16 | 16 | 8 | 4 | 1 |
| 1 | 4 | 8 | 16 | 16 | 8 | 4 | 1 |
| 1 | 4 | 8 | 8 | 8 | 8 | 4 | 1 |
| 1 | 4 | 4 | 4 | 4 | 4 | 4 | 1 |
| 1 | 1 | 1 | 1 | 1 | 1 | 1 | 1 |

FIG.10

| 45 | 36 | 24 | 30 | 12 | 6 | 0 | 1 |
|---|---|---|---|---|---|---|---|
| 30 | 24 | 18 | 15 | 9 | 3 | 1 | 1 |
| 36 | 15 | 12 | 6 | 3 | 1 | 1 | 1 |
| 24 | 21 | 6 | 3 | 2 | 1 | 1 | 1 |
| 12 | 9 | 4 | 4 | 2 | 1 | 1 | 1 |
| 4 | 3 | 2 | 3 | 1 | 1 | 1 | 1 |
| 3 | 1 | 1 | 1 | 1 | 1 | 1 | 1 |
| 1 | 1 | 1 | 1 | 1 | 1 | 1 | 1 |

FIG.11

| 45 | 36 | 24 | 30 | 12 | 6 | 0 | 0 |
|---|---|---|---|---|---|---|---|
| 30 | 24 | 18 | 15 | 9 | 0 | 0 | 0 |
| 36 | 15 | 12 | 6 | 0 | 0 | 0 | 0 |
| 24 | 21 | 6 | 0 | 0 | 0 | 0 | 0 |
| 12 | 9 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG.12

| 2 | 2 | 2 | 2 | 2 | 2 | 1 | 2 |
|---|---|---|---|---|---|---|---|
| 2 | 4 | 4 | 6 | 6 | 4 | 6 | 2 |
| 2 | 6 | 10 | 8 | 8 | 10 | 4 | 1 |
| 2 | 4 | 8 | 15 | 14 | 10 | 4 | 1 |
| 2 | 4 | 10 | 16 | 16 | 8 | 6 | 2 |
| 2 | 4 | 8 | 8 | 10 | 10 | 4 | 2 |
| 1 | 6 | 4 | 4 | 6 | 6 | 4 | 1 |
| 2 | 2 | 2 | 1 | 1 | 2 | 2 | 1 |

|   | COLUMN | | | | | | | | | | | | | | | |
|---|---|---|---|---|---|---|---|---|---|---|---|---|---|---|---|---|
|   | 0 | 1 | 2 | 3 | 4 | 5 | 6 | 7 | 8 | 9 | 10 | 11 | 12 | 13 | 14 | 15 |
| 0 | 0 | 0 | 0 | 1 | 1 | 1 | 1 | 1 | 1 | 0 | 0 | 0 | 0 | 0 | 0 | 0 |
| 1 | 0 | 0 | 1 | 1 | 1 | 1 | 1 | 1 | 1 | 1 | 0 | 0 | 0 | 0 | 0 | 0 |
| 2 | 0 | 1 | 1 | 0 | 0 | 0 | 0 | 0 | 0 | 1 | 1 | 0 | 0 | 0 | 0 | 0 |
| 3 | 1 | 1 | 0 | 0 | 0 | 0 | 0 | 0 | 0 | 0 | 1 | 1 | 0 | 0 | 0 | 0 |
| 4 | 1 | 1 | 0 | 0 | 0 | 0 | 0 | 0 | 0 | 0 | 1 | 1 | 0 | 0 | 0 | 0 |
| 5 | 1 | 1 | 0 | 0 | 0 | 0 | 0 | 0 | 0 | 0 | 1 | 1 | 0 | 0 | 0 | 0 |
| 6 | 1 | 1 | 0 | 0 | 0 | 0 | 0 | 0 | 0 | 1 | 1 | 1 | 0 | 0 | 0 | 0 |
| 7 | 0 | 1 | 1 | 0 | 0 | 0 | 0 | 0 | 1 | 1 | 1 | 1 | 0 | 0 | 0 | 0 |
| 8 | 0 | 0 | 1 | 1 | 1 | 1 | 1 | 1 | 1 | 0 | 1 | 1 | 0 | 0 | 0 | 0 |
| 9 | 0 | 0 | 0 | 1 | 1 | 1 | 1 | 1 | 0 | 0 | 1 | 1 | 0 | 0 | 0 | 0 |
| 10 | 0 | 0 | 0 | 0 | 0 | 0 | 0 | 0 | 0 | 0 | 1 | 1 | 0 | 0 | 0 | 0 |
| 11 | 0 | 0 | 0 | 0 | 0 | 0 | 0 | 0 | 0 | 0 | 1 | 1 | 0 | 0 | 0 | 0 |
| 12 | 0 | 0 | 0 | 0 | 0 | 0 | 0 | 0 | 0 | 0 | 1 | 1 | 0 | 0 | 0 | 0 |
| 13 | 0 | 0 | 0 | 0 | 0 | 0 | 0 | 0 | 0 | 0 | 1 | 1 | 0 | 0 | 0 | 0 |
| 14 | 0 | 0 | 0 | 0 | 0 | 0 | 0 | 0 | 0 | 0 | 1 | 1 | 0 | 0 | 0 | 0 |
| 15 | 0 | 0 | 0 | 0 | 0 | 0 | 0 | 0 | 0 | 0 | 1 | 1 | 0 | 0 | 0 | 0 |

COLUMN

|  | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 69 | 16 | 0 | 21 | -10 | -1 | 8 | -3 | -1 | -3 | 8 | -1 | -10 | 21 | 0 | -16 |
|   | 0 | 2 | -27 | 0 | 7 | -15 | 0 | 2 | 0 | -2 | 0 | 15 | -7 | 0 | 27 | -2 |
| 1 | -6 | -2 | -4 | -7 | -6 | 0 | -4 | 0 | 0 | 0 | 1 | 1 | 9 | -1 | 5 | 3 |
|   | -11 | -10 | -5 | 0 | -4 | 1 | 1 | -2 | 0 | 0 | 0 | -4 | -1 | -2 | -14 | -3 |
| 2 | 16 | -18 | 0 | -10 | 0 | 0 | 0 | 0 | 0 | 0 | -2 | 4 | 0 | -10 | -7 | -2 |
|   | -3 | -14 | 9 | 4 | 3 | 3 | 3 | 0 | 0 | -1 | 1 | -6 | 0 | 2 | -3 | 18 |
| 3 | -8 | -2 | -2 | 0 | -1 | 7 | 0 | 2 | -1 | -1 | 0 | -3 | 9 | 0 | 4 | 3 |
|   | -4 | 2 | 0 | 8 | 0 | 3 | 0 | -2 | 0 | 0 | 5 | 2 | 1 | 7 | -8 | 2 |
| 4 | 8 | -12 | 2 | 0 | 5 | 0 | 3 | -2 | 2 | 0 | 3 | -2 | 1 | -2 | -9 | 5 |
|   | -7 | -5 | 9 | 0 | 4 | -3 | 1 | -2 | 1 | 0 | 0 | -1 | -6 | 2 | -3 | 12 |
| 5 | -1 | -1 | 0 | 0 | 2 | 3 | 0 | 1 | -2 | -1 | 0 | 0 | 3 | 2 | 1 | 1 |
|   | -1 | 2 | 0 | 4 | -1 | 2 | -3 | 0 | -1 | 1 | 1 | 4 | 0 | 3 | -3 | 0 |
| 6 | 1 | -4 | 3 | 1 | 4 | 0 | 0 | -1 | 1 | 0 | 3 | 0 | 0 | 0 | -5 | 4 |
|   | -5 | 0 | 5 | -2 | 0 | -4 | 0 | -2 | 1 | 0 | -1 | -1 | -4 | 0 | -1 | 5 |
| 7 | 0 | 0 | 1 | -1 | 0 | 0 | -1 | -1 | -1 | -2 | -1 | 0 | -1 | 0 | 0 | 0 |
|   | 0 | 0 | 0 | 0 | -2 | 0 | -2 | 0 | -1 | 1 | -1 | 2 | 0 | 0 | 0 | 0 |
| 8 | -1 | 0 | 0 | 0 | 0 | 0 | 0 | 0 | 1 | 0 | 0 | 0 | 0 | 0 | 0 | 0 |
|   | 0 | 0 | 0 | 0 | -1 | 0 | 0 | 0 | 0 | 0 | 0 | 0 | 1 | 0 | 0 | 0 |
| 9 | 0 | 0 | 0 | 0 | -1 | 0 | -1 | -2 | -1 | -1 | -1 | 0 | 0 | -1 | 1 | 0 |
|   | 0 | 0 | 0 | 0 | 0 | -2 | 1 | -1 | 1 | 0 | 2 | 0 | 2 | 0 | 0 | 0 |
| 10 | 1 | 4 | -5 | 0 | 0 | 0 | 3 | 0 | 1 | -1 | 0 | 0 | 4 | 1 | 3 | -4 |
|    | 5 | -5 | 0 | 0 | 4 | 1 | 1 | 0 | -1 | 2 | 0 | 4 | 0 | 2 | -5 | 0 |
| 11 | -1 | 1 | 1 | 2 | 3 | 0 | 0 | -1 | -2 | 1 | 0 | 3 | 2 | 0 | 0 | -1 |
|    | 1 | 0 | 3 | -3 | 0 | -4 | -1 | -1 | 1 | 0 | 3 | -2 | 1 | -4 | 0 | -2 |
| 12 | 8 | 5 | -9 | -2 | 1 | -2 | 3 | 0 | 2 | -2 | 3 | 0 | 5 | 0 | 2 | -12 |
|    | 7 | -12 | 3 | -2 | 6 | 1 | 0 | 0 | -1 | 2 | -1 | 3 | -4 | 0 | -9 | 5 |
| 13 | -3 | 3 | 4 | 0 | 9 | -3 | 0 | -1 | -1 | 2 | 0 | 7 | -1 | 0 | -2 | -2 |
|    | 4 | -2 | 8 | -7 | -1 | -2 | -5 | 0 | 0 | 2 | 0 | -3 | 0 | -8 | 0 | -2 |
| 14 | 16 | -2 | -7 | -10 | 0 | -4 | -2 | 0 | 0 | 0 | 0 | 0 | 0 | -10 | 0 | -18 |
|    | 3 | -18 | 3 | -2 | 0 | 6 | -1 | 1 | 0 | 0 | -3 | -3 | -3 | -4 | -9 | 14 |
| 15 | -6 | 3 | 5 | -1 | 9 | 1 | 1 | 0 | 0 | 0 | -4 | 0 | -6 | -7 | -4 | -2 |
|    | 11 | 3 | 14 | 2 | 1 | 4 | 0 | 0 | 0 | 2 | -1 | -1 | 4 | 0 | 5 | 10 |

ROW

FIG.14

COLUMN

| ROW | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 69 | 0 | -16 | 0 | 0 | 0 | 21 | 0 | -10 | 0 | -1 | 0 | 8 | 0 | -3 | 0 |
|   | 0 | 0 | 2 | 0 | -27 | 0 | 0 | 0 | 7 | 0 | -15 | 0 | 0 | 0 | 2 | 0 |
| 1 | 0 | 0 | 0 | 0 | 0 | 0 | 0 | 0 | 0 | 0 | 0 | 0 | 0 | 0 | 0 | 0 |
|   | 0 | 0 | 0 | 0 | 0 | 0 | 0 | 0 | 0 | 0 | 0 | 0 | 0 | 0 | 0 | 0 |
| 2 | -6 | 0 | -2 | 0 | -4 | 0 | -7 | 0 | -6 | 0 | 0 | 0 | -4 | 0 | 0 | 0 |
|   | -11 | 0 | -10 | 0 | -5 | 0 | 0 | 0 | -4 | 0 | 1 | 0 | 1 | 0 | -2 | 0 |
| 3 | 0 | 0 | 0 | 0 | 0 | 0 | 0 | 0 | 0 | 0 | 0 | 0 | 0 | 0 | 0 | 0 |
|   | 0 | 0 | 0 | 0 | 0 | 0 | 0 | 0 | 0 | 0 | 0 | 0 | 0 | 0 | 0 | 0 |
| 4 | 16 | 0 | -18 | 0 | 0 | 0 | -10 | 0 | 0 | 0 | 0 | 0 | 0 | 0 | 0 | 0 |
|   | -3 | 0 | -14 | 0 | 9 | 0 | 4 | 0 | 3 | 0 | 3 | 0 | 3 | 0 | 0 | 0 |
| 5 | 0 | 0 | 0 | 0 | 0 | 0 | 0 | 0 | 0 | 0 | 0 | 0 | 0 | 0 | 0 | 0 |
|   | 0 | 0 | 0 | 0 | 0 | 0 | 0 | 0 | 0 | 0 | 0 | 0 | 0 | 0 | 0 | 0 |
| 6 | -3 | 0 | -2 | 0 | -2 | 0 | 0 | 0 | -1 | 0 | 7 | 0 | 0 | 0 | 2 | 0 |
|   | -4 | 0 | 2 | 0 | 0 | 0 | 8 | 0 | 0 | 0 | 3 | 0 | 0 | 0 | -2 | 0 |
| 7 | 0 | 0 | 0 | 0 | 0 | 0 | 0 | 0 | 0 | 0 | 0 | 0 | 0 | 0 | 0 | 0 |
|   | 0 | 0 | 0 | 0 | 0 | 0 | 0 | 0 | 0 | 0 | 0 | 0 | 0 | 0 | 0 | 0 |
| 8 | 8 | 0 | -12 | 0 | 2 | 0 | 0 | 0 | 5 | 0 | 0 | 0 | 3 | 0 | -2 | 0 |
|   | -7 | 0 | -5 | 0 | 9 | 0 | 0 | 0 | 4 | 0 | -3 | 0 | 1 | 0 | -2 | 0 |
| 9 | 0 | 0 | 0 | 0 | 0 | 0 | 0 | 0 | 0 | 0 | 0 | 0 | 0 | 0 | 0 | 0 |
|   | 0 | 0 | 0 | 0 | 0 | 0 | 0 | 0 | 0 | 0 | 0 | 0 | 0 | 0 | 0 | 0 |
| 10 | -1 | 0 | -1 | 0 | 0 | 0 | 0 | 0 | 2 | 0 | 3 | 0 | 0 | 0 | 1 | 0 |
|    | -1 | 0 | 2 | 0 | 0 | 0 | 4 | 0 | -1 | 0 | 2 | 0 | -3 | 0 | 0 | 0 |
| 11 | 0 | 0 | 0 | 0 | 0 | 0 | 0 | 0 | 0 | 0 | 0 | 0 | 0 | 0 | 0 | 0 |
|    | 0 | 0 | 0 | 0 | 0 | 0 | 0 | 0 | 0 | 0 | 0 | 0 | 0 | 0 | 0 | 0 |
| 12 | 1 | 0 | -4 | 0 | 3 | 0 | 1 | 0 | 4 | 0 | 0 | 0 | 0 | 0 | -1 | 0 |
|    | -5 | 0 | 0 | 0 | 5 | 0 | -2 | 0 | 0 | 0 | -4 | 0 | 0 | 0 | -2 | 0 |
| 13 | 0 | 0 | 0 | 0 | 0 | 0 | 0 | 0 | 0 | 0 | 0 | 0 | 0 | 0 | 0 | 0 |
|    | 0 | 0 | 0 | 0 | 0 | 0 | 0 | 0 | 0 | 0 | 0 | 0 | 0 | 0 | 0 | 0 |
| 14 | 0 | 0 | 0 | 0 | 1 | 0 | -1 | 0 | 0 | 0 | 0 | 0 | -1 | 0 | -1 | 0 |
|    | 0 | 0 | 0 | 0 | 0 | 0 | 0 | 0 | -2 | 0 | 0 | 0 | -2 | 0 | 0 | 0 |
| 15 | 0 | 0 | 0 | 0 | 0 | 0 | 0 | 0 | 0 | 0 | 0 | 0 | 0 | 0 | 0 | 0 |
|    | 0 | 0 | 0 | 0 | 0 | 0 | 0 | 0 | 0 | 0 | 0 | 0 | 0 | 0 | 0 | 0 |

APPARATUS AND METHOD FOR THE COMPRESSION AND TRANSMISSION OF MULTIFORMAT DATA

TECHNICAL FIELD

This invention relates to data compression and transmission systems that compress, process and multiplex, at one site, data having various formats, transmit the data to another site, and effectively regenerate the data as originally formatted.

BACKGROUND ART

This application references all material contained in the patent titled Multichannel Data Compressor, U.S. Pat. No. 4,995,036, issued Feb. 19, 1991. Embodiments of the apparatus disclosed and claimed in the referenced patent application constitutes certain of the elements of the combination of the present invention. The information included in the referenced patent applications has been included for technical reference purposes and is not to be regarded as essential subject matter on which the claims of the present application depend for support or upon which the application depends for adequate disclosure of the invention.

The transform scaling data compression and image processing apparatus is a data compressor and image processor for a data transmission system wherein data representing elements of a video image are mathematically transformed, and a certain number of resulting transform coefficients are eliminated according to an established threshold. The reduced number of transform coefficients are then transmitted by a communication link to a scaling filter, which expands the received data to reestablish the original number of transform coefficients. The latter are inversely mathematically transformed to acceptably reproduce the original data representing elements of the video image. An image processor is also included to identify objects represented by the video image.

Past efforts to improve the efficiency of data transmission have included such methods as increasing the rate at which data is sent. As the rate increases, however, the required bandwidth of the transmission system also increases. One method for avoiding prohibitive bandwidth problems is to digitize and compress data, thereby reducing the total number of bits of information, before it is transmitted.

Schiller, in U.S. Pat. No. 4,723,298, teaches an image compression apparatus that reduces the number of elements representing an image by dividing the total number of picture elements in the image into units each containing rows and columns of individual picture elements; assigning to each unit a single binary value, which is a weighted function of the binary value of each of the picture elements in the unit; further dividing the total number of units into rows and columns of sets; and assigning to each set a single binary value, which is a weighted function of the binary value of each of the units in the set.

Grayson, in U.S. Pat. No. 4,783,841, teaches a data compressor apparatus that compares data blocks of decreasing size with a group of patterns relevant to each size. If a match is found, the matched data block is represented on an input signal by a code identifying the pattern. If a lower size limit is reached with no matches being found, the data itself is applied to the output signal.

Sato, et al., in U.S. Pat. No. 4,797,741, teach an information signal transmission system that divides an original image information signal consisting of a number of picture elements arranged in rows and columns into a plurality of small blocks, each consisting of rows and columns of picture elements, to provide a plurality of compression modes of different information compression rates.

Shimoni, et al., in U.S. Pat. No. 4,809,350, teach a data compression system that compresses data representing the difference between uncompressed data and predicted further data by encoding the difference data using a string length code arrangement for the most prevalent difference data, encoding the second most prevalent data with a replacement code that is the shortest, and encoding the sequentially next most prevalent difference data with the shortest replacement code not previously used.

Methods and apparatuses for changing the scale or size of images are disclosed by U.S. Pat. Nos. 4,790,028; 4,809,083; and 4,809,345. Methods and apparatuses using mathematical transforms for recognizing and processing images are disclosed in U.S. Pat. Nos. 4,590,608; 4,621,337; 4,703,349; 4,744,659; 4,764,973; 4,764,974; and 4,817,176. Apparatuses using neighbor transforms and matrix operators for recognizing and processing images are disclosed in U.S. Pat. Nos. 4,630,308; 4,641,351; 4,703,513; 4,776,025; 4,736,439; and 4,805,228.

In present practice, mathematical transform techniques are typically used to facilitate image compression in the following manner. Images are focused on a matrix of cells, each representing a picture element, or pixel, constituting a camera retina. The cells might be, for example, photoelectric or photodiode-type devices that produce electrical voltages proportional to the intensity of light striking them. The cells are then scanned by a video circuit to produce an analog video signal. The analog video signal is digitized, and a portion of the digitized signal representing one video frame is accumulated in a frame storage matrix, or frame buffer, comprising the same number of cells, in the same relative positions, as the camera retina. Each cell of the frame storage matrix comprises a digital word containing bits of binary data representing levels on a gray scale.

A two-dimensional, mathematical transform is performed on the stored signal representing the video frame values, and the electrical representations of the transformed values are stored in a transform frame storage matrix. The transformed values represent transform coefficients.

Relatively acceptable picture quality can often be maintained even if half to three quarters of the transform coefficients are deleted; therefore, data compression can be achieved by deleting a portion of the transform coefficients. The means for doing this have been the subject of much of the literature on image compression by transform methods; but it may be said that, in essence, this is done by deleting all coefficients having values below a certain threshold level.

The remaining transform coefficient values may then be transmitted by way of a pulse code modulation (PCM) signal to a receiver and stored in a receiver frame storage matrix. The transform coefficient values are arranged in the same relative positions as they were when stored in the transform frame storage matrix. The electrical representations of zero are placed in cells that would have been occupied by transform coefficients that were deleted.

An inverse mathematical transform is performed on the stored transform coefficient values, and the electrical representations of the inversely transformed values are stored in a receiver inverse transform frame storage matrix. The values represented are similar to those stored in the frame storage matrix, and their digital electrical representations are converted to an analog video signal. The analog video signal is then applied to a video screen to create an acceptable likeness of the original video image.

The Multichannel Data Compressor is a data compressor for a data transmission system wherein the data from a plurality of data sources is compressed and multiplexed to generate a compressed data word that significantly increases the sampling rate of the plurality of data sources over the sampling rate if the data from each data source was transmitted in its entirety.

The Multichannel Data Compressor has a plurality of data latches for temporarily storing the data generated by each data source and a plurality of difference circuits, one for each data source, which subtract the data stored in the data latches from the next subsequent data value generated by the data sources to generate a difference data value. A plurality of summing circuits sum the difference data values to generate a plurality of composite data values. A selector switch transfers the composite data values or selected current data values to a multiplexer when the magnitude of at least one of the composite data values exceeds a predetermined value. The multiplexer formats the received data into a predetermined format, converts it to a serial format, then forwards the data to a transmitter for transmission. A receiver system has a multichannel data decompressor that regenerates, in response to a received data transmission, data as originally generated by the data sources.

Data compression has been known in the art to reduce the bandwidth of the transmission system or to increase the sampling rate of the data to be sent. As data requirements become higher and higher, data compression remains one way in which more data can be transmitted without having to increase the bandwidth of the transmission system. Eng et al. in U.S. Pat. No. 4,593,318 discloses a technique for time compressing television signals in which the transmission comprises a line, frame, or field, as received plus two other lines, frames or fields as differential signals. Eng et al. also teaches multiplexing the output of three different video sources so that the output of the three different video sources can be transmitted in the same time span normally required to transmit the same data, as originally generated from a single video data source.

Cavanaugh, in U.S. Pat. No. 4,099,202, Brown et al. in U.S. Pat. No. 4,237,484, Shimoyama et al. in U.S. Pat. No. 4,542,406 and Tu in U.S. Pat. No. 4,544,950 teach the multiplexing of the digital audio and video data for simultaneous transmission, rather than transmitting them on separate sidebands as done with commercial television transmissions.

DISCLOSURE OF INVENTION

An object of the present invention is to compress data from a plurality of data sources to minimize the bandwidth required for its transmission.

Another object of the present invention is to generate a plurality of data values that are a composite of the data generated by the plurality of data sources.

Yet another object of the present invention is to increase the sampling rate of a transmission system without increasing its bandwidth.

Still another object of the present invention is to provide an improved data compressor capable of reducing the number of video elements representing a video image to enable more accurate and efficient transmission and image processing.

Another object of the present invention is to provide an improved data compressor capable of reducing the effective size of a video image by reducing the number of picture elements representing it to a minimum number required to reproduce an acceptable reproduction of the original video image, thereby facilitating the task of image processing as well as transmission.

In carrying out the foregoing and other objects, the present invention includes, for use at a remote site, a Transform Scaling Data Compressor to receive and process video data, a Delta Modulation (DM) Data Modulator to receive and process audio data, a Delta-Sigma Modulation (D-SM) Data Modulator to receive and process digital data, a Multichannel Data Compressor to receive and process data from the three aforementioned data systems, and a transmitter for transmitting compressed and multiplexed data output from the Multichannel Data Compressor to a base site.

The present invention also includes, for use at a base site, a receiver to receive the transmitted, compressed data, a Multichannel Data Decompressor to receive, demultiplex, decompress and distribute video data to a Transform Scaling Data Decompressor and Image Processor, audio data to a Delta Modulation Data Demodulator, and digital data to a Delta-Sigma Modulation Data Demodulator to provide effective reproductions respectively of the video data, audio data and digital data obtained at the remote site. Provision is also made for receiving, compressing, multiplexing and transmitting data originating at the base site and for receiving, demultiplexing, decompressing and distributing it at the remote site.

The Transform Scaling Data Compressor compresses data representing a video image by deleting transformed data representing elements of the image, thus representing the image with fewer video elements. The data is then transmitted; and, upon reception, a scaling filter is used to expand the reduced amount of image data to reestablish the original number of image elements.

The preferred embodiment has a Transform Scaling Data Compressor that basically includes a video detector to convert visual images into electrical representations thereof; a transform device to perform a two-dimensional, mathematical transform on the electrical representations of the visual images to provide electrical representations of transform coefficients; and a data compressor to threshold the electrical representations of the transform coefficients to reduce the total number thereof for transmission.

The preferred embodiment also has a Transform Scaling Data Decompressor and Image Processor that basically includes a scaling filter to insert electrical representations of a value between received electrical representations of the transform coefficients to reestablish the original number thereof; an inverse transform device to inversely mathematically transform the electrical representations of the transform coefficients to recover the electrical representations of the video images; an image processor to perform tasks including potential target identification, edge detection and map data manipulation and storage; and a video display to display the video images.

The preferred embodiment uses a unique application of the Scaling Theorem of Fourier Transform Theory. A benefit of transmitting a Fourier or similar transform of an image rather than the image itself is provided by virtue of the fact that, since each point in a reconstructed image represents a weighted sum of all points in the spacial frequency domain, the Fourier transform is significantly less susceptible to transmission channel errors.

Another benefit derived by transmitting a Fourier Transform of an image instead of the actual image results from the fact that image energy is usually uniformly distributed in the spatial domain and tends to concentrate near the origin of a Fourier domain. This means that the image energies of a substantial number of higher spacial frequency components have very low magnitudes. The exclusion of these components from the transmitted data has an acceptably minimal effect on the reconstructed image and permits a significant reduction in the bandwidth required to transmit the data.

The reduction of the total amount of image data to be transmitted over a bandwidth-limited communication channel also significantly reduces the time required for image processing by effectively reducing the amount of video data that must be processed for pattern recognition.

The Delta Modulation (DM) Data Modulator may be compared to a Pulse Code Modulation (PCM) Data Modulator. While PCM systems are among the most efficient existing communication systems, requiring, for example, much less power to transmit a signal than would be needed for its direct transmission, the installation of PCM systems is generally quite complex. Additionally, the modulation and demodulation circuits of PCM systems are complicated and expensive. DM is almost as efficient as PCM; and, although DM requires a wider bandwidth, it uses much simpler and less expensive circuitry.

A DM system is effectively a differential PCM system. In a PCM system, an n-digit binary code is used to transmit data. In a DM system, a single-digit code is used. Transmitted pulses carry data corresponding to the derivative of the amplitude of the data function. Upon reception, the pulses are integrated to obtain the original waveform.

The preferred embodiment of the Delta Modulation Data Modulator basically includes a pulse generator, which generates clock pulses, and a pulse modulator connected to the pulse generator to receive the clock pulses and to generate positive output pulses in response thereto whenever the sign of a difference signal also received by the pulse modulator is positive and to generate negative output pulses whenever the sign of the difference signal received is negative.

The DM Data Modulator also includes a feedback loop including an integrating network connected to the pulse modulator to receive output pulses therefrom and to generate a synthesized signal in response thereto. The feedback loop also includes a comparator connected between the integrating network and the pulse modulator. An audio data signal is input to the comparator and is thereby compared with the synthesized signal generated by the integrating network, the comparator generating the difference signal in response to the difference between the audio data signal and the synthesized signal.

As mentioned, the sign of the difference signal determines the sign of the output pulses generated by the pulse modulator. This compensates for the difference between the audio data signal and the synthesized signal voltages, effectively reducing the difference so that the overall configuration of the synthesized signal, which is in the form of a step wave, substantially coincides with that of the audio data signal.

The preferred embodiment of the Delta Modulation Data Demodulator basically includes an integrating network and a low-pass filter. The output pulses received from the pulse modulator of the DM Data Modulator are input to the integrating network, which generates a signal comparable to the synthesized signal, comprising the original audio data signal plus noise components resulting from sampling. The low-pass filter substantially removes the noise components, leaving a reconstruction of the original audio data signal.

Although a Delta Modulation Data Modulator has an advantage of including simpler and less expensive circuits than does a Pulse Code Modulator, the former is not capable of transmitting direct-current signals, its dynamic range and signal-to-noise ratio are inversely proportional to signal frequency, and receiver integration causes an accumulative error in the demodulated signal whenever the system is subjected to transmission disturbances such as noise.

The Delta-Sigma Modulation (D-SM) Data Modulator has been included to provide for the transmission of digital signals, to provide a stable performance and to provide signal-to-noise ratio independence from signal frequency. The preferred embodiment of the D-SM Data Modulator basically includes a pulse generator, which generates clock pulses, and a pulse modulator connected to the pulse generator to receive the clock pulses and to generate positive output pulses in response thereto whenever the amplitude of an integrated difference signal also received by the pulse modulator is positive, that is, when the integrated difference signal is greater than a reference level, and to generate no output pulses whenever the sign of the integrated difference signal received is negative.

The D-SM Data Modulator also includes a feedback loop including a comparator connected to the pulse modulator to receive output pulses therefrom. An audio data signal is input to the comparator and is thereby compared with the output pulses received from the pulse modulator, the comparator generating a difference signal in response to the difference between the audio data signal and the output pulses. The feedback loop also includes an integration network to receive the difference signal from the comparator and generate the integrated difference signal in response thereto.

As mentioned, the sign of the integrated difference signal determines whether or not output pulses are generated by the pulse modulator. As a consequence of this negative feedback process, the integrated difference signal level is maintained near the pulse modulator reference level. As the amplitude of the audio data signal increases, the number of output pulses increases; therefore, data corresponding to the amplitude of the audio data signal is conveyed by the output pulses.

The preferred embodiment of the D-SM Data Demodulator basically includes a low-pass filter. The output pulses received from the pulse modulator of the D-SM Data Modulator may be input directly to the low-pass filter for demodulation since no pulse integration is required. Since the demodulation process requires no integration, no accumulative error due to transmission disturbances will be present in the demodulated signal, which is a reconstruction of the original audio data signal.

As mentioned, the Multichannel Data Compressor receives data from the Transform Scaling Data Compressor, from the Delta Modulation Data Modulator and from the Delta-Sigma Modulation Data Modulator, compresses and multiplexes the data and inputs it to the transmitter for transmission to the base sight. The receiver at the base site receives the data and inputs it to the Multichannel Data Decompressor, which demultiplexes and demodulates the data and distributes it to the Transform Scaling Data Decompressor and Image Processor, to the Delta Modulation Data Demodulator and to the Delta-Sigma Modulation Demodulator.

The preferred embodiment of the Multichannel Data Compressor includes a plurality of difference amplifiers, one for each data source, which subtract the previous data value generated by its associated data source from the current data value to generate a plurality of difference data values. A like plurality of summing means sum the plurality of difference data in different sequences to generate a plurality of composite data values. A multiplexer multiplexes the plurality of composite data values in a predetermined format to generate a compressed data word for transmission by the transmitter.

The preferred embodiment of the Multichannel Data Decompressor includes a demultiplexer for demultiplexing the transmitted compressed data word to reconstruct each of the plurality of composite data values. Composite data sum amplifiers sum selected composite data values to generate correction data values that correspond to the difference data values generated by the Multichannel Data Compressor. A plurality of adders, one associated with each data value, add each correction data value to its associated data value to update each of the data values stored in a current data latch to generate a current data value.

A selector switch is provided in the Multichannel Data Compressor to transfer selected data values received from the data sources when one or more of the composite data values exceeds a predetermined value.

The objects, features and advantages of the present invention will become readily apparent to one skilled in the art from the following detailed description of the best mode for carrying out the invention when read in conjunction with the accompanying drawings.

BRIEF DESCRIPTION OF THE DRAWINGS

FIG. 2 is a block diagram showing an element of FIG. 1 in greater detail;

FIG. 3 is a block diagram showing another element of FIG. 1 in greater detail;

FIG. 4 is a block diagram showing an element of FIG. 2 in greater detail;

FIG. 5 is a block diagram showing another element of FIG. 2 in greater detail;

FIG. 6 is a block diagram showing an element of FIG. 5 in greater detail;

FIG. 7 is a block diagram showing another element of FIG. 1 in greater detail;

FIG. 8 is a representation of an example of analog video voltage levels, representing a single frame of video image data, as produced by an element shown in FIG. 4;

FIG. 9 is a representation of an example of digitized video voltage levels, representing a single frame of video image data, as produced by another element shown in FIG. 5;

FIG. 10 is a representation of an example of transform coefficients, representing a single frame of video image data, as produced by another element shown in FIG. 2;

FIG. 11 is a representation of an example of transform coefficients, representing a single frame of video image data, after being produced by another element shown in FIG. 2;

FIG. 12 is a representation of an example of inverse transform coefficients, representing a single frame of video image data, produced by an element shown in FIG. 3;

FIG. 13 is a representation of an example of digital video voltages stored in another element shown in FIG. 5 and represents a single frame of video image data prior to being transformed;

FIG. 14 is a representation of an example of voltages stored in another element shown in FIG. 5 and represents transformed versions of the values stored in another element shown in FIG. 5, and a portion of FIG. 14 is also a representation of an example of voltages stored in an element shown in FIG. 7;

FIG. 15 is a representation of an example of scaled versions of the voltages stored in another element shown in FIG. 7;

FIG. 16 is a representation of inversely transformed versions of the values shown in FIG. 15 and stored in another element shown in FIG. 7;

FIG. 17 is a representation of thresholded versions of the voltages stored in another element shown in FIG. 7.

BEST MODE FOR CARRYING OUT THE INVENTION

Figure 1:
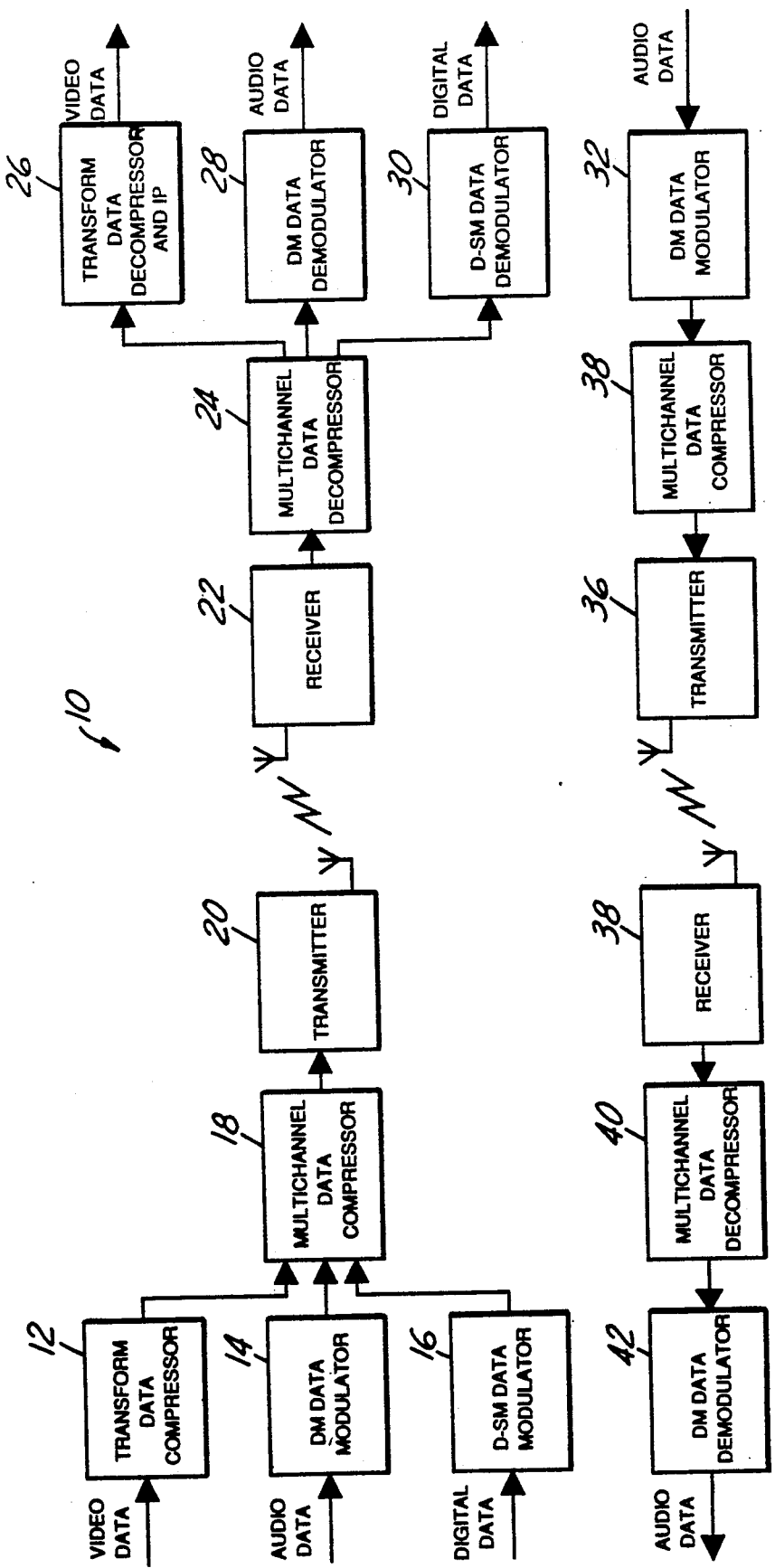
FIG. 1 is a block diagram of a data communication system embodying features of the present invention.

With reference to FIG. 1, the Multiformat Data Compressor, generally indicated by reference numeral 10, includes, for use at a remote site, a Transform Scaling Data Compressor 12 to receive and process video data, a Delta Modulation (DM) Data Modulator 14 to receive and process audio data, a Delta-Sigma Modulation Data Modulator 16 to receive and process digital data, a Multichannel Data Compressor 18 to receive and process data from the three aforementioned data systems, and a transmitter 20 for transmitting compressed and multiplexed data output from the Multichannel Data Compressor 18 to a base site.

The present invention also includes, for use at a base site, a receiver 22 to receive the transmitted, compressed data, a Multichannel Data Decompressor 24 to receive, decompress and distribute video data to a Transform Scaling Data Decompressor and Image Processor 26, audio data to a Delta Modulation Data Demodulator 28, and digital data to a Delta-Sigma Modulation Data Demodulator 30 to provide effective reproductions respectively of the video data, audio data and digital data obtained at the remote site.

Provision may also be made for receiving, compressing, multiplexing and transmitting data originating at the base site and for receiving, demultiplexing, decompressing and distributing it at the remote site. Shown is a Delta Modulation (DM) Data Modulator 32 to receive and process audio data, a Multichannel Data Compressor 34 to receive processed data from the DM Data Modulator 32, and a transmitter 36 for transmitting compressed data output from the Multichannel Data Compressor 34 to the remote site. At the remote site, another Multichannel Data Decompressor 40 is shown having an input from a receiver 38 and an output to a Delta Modulation Data Modulator 42. It is to be understood that data from a greater number of sources may be transmitted using the concept of the Multichannel Data Compressor.

With reference to FIG. 2 of the drawings, the Transform Scaling Data Compressor made in accordance with the present invention is generally indicated by reference numeral 12. It may, as shown, receive video data from a video detector 44 that converts visual images into electrical, video image data representations thereof. The Transform Scaling Data Compressor basically includes a transform device 46 that performs a two-dimensional, mathematical transform on the image data, producing transform coefficients, and includes a data compressor 48 that reduces the number of transform coefficients by setting all values below a certain level to zero.

As shown in FIG. 3 of the drawings, the preferred embodiment of the Transform Scaling Data Decompressor 26 basically includes a scaling filter 50 that inserts a value between received transform coefficients to reestablish the original number thereof; an inverse transform device 52 that inversely mathematically transforms the expanded transform coefficients to produce inverse transform coefficients to acceptably reproduce the image data; and an inverse threshold selection device 54 that reduces the number of inverse transform coefficients by setting all values below a certain threshold to zero and all values equal to or greater than the threshold to one.

A video display 56 may be included to display a constructive reproduction of the original video image using the reduced number of inverse transform coefficients. Since the video image is reproduced using the reduced number of inverse transform coefficients, the size of a video image acceptably reproducing the original video image will also be reduced. An image processor 58 may also be included to perform tasks including potential target identification, edge detection and map data manipulation and storage, these tasks being significantly facilitated due to the fact that substantially less data need be processed by the image processor 58.

As illustrated in FIG. 4, the video detector 44 includes a video camera 60 having a retina 62 typically including a matrix of 512 by 512 cells. Each cell may comprise a photodiode-type device that produces an electrical voltage proportional to the intensity of any light that might impinge thereon, the electrical voltage being representative of a picture element, or pixel. Each pixel could assume more than two values, typically assuming a number of values sufficient to represent up to 256 gray scale levels. An associated video circuit 64 causes the cells of the retina 62 to be scanned, line by line, and generates an analog video signal the amplitude of which is a function of the voltages of the scanned cells.

The transform device 46 shown in FIG. 2, includes, as illustrated in FIG. 5, an analog-to-digital converter 66 that converts an incoming analog video signal (AVS) to a digital video signal (DVS). A digital switch 68 acts as a single-pole-double-throw switch to alternately input the digital video signal to a first frame buffer 70 or to a second frame buffer 72, each of which is a random access memory (RAM) capable of storing a frame of video image information in the form of digital electrical signals. A multiplexer (MPX) 74 receives the electrical signals from the first frame buffer 70 and the second frame buffer 72 and conveys them to a transform apparatus 76, which performs a two-dimensional, mathematical transform upon them. The two-dimensional transform generates transform coefficients that are stored in a transform frame storage matrix 78.

The data compressor 48 shown in FIG. 2 includes, as illustrated in FIG. 5, a transform coefficient selection device 80 that reduces the total number of transform coefficients received from the transform frame storage matrix 78 by eliminating those below a specific threshold.

The transform apparatus 76 is shown in detail in FIG. 6 and includes a first (row) vector signal processor 82, a second (column) vector signal processor 84, and a transform controller 86. In association with a row pixel counter 88 and a temporary pixel storage 90, which may be a random access memory (RAM), and under the direction of the transform controller 86, the row vector signal processor 82 performs a Fast Fourier Transform (FFT) on the video image data stored in the rows of first frame and second frame buffers 70 and 72 respectively, and the column vector signal processor 84 performs a Fast Fourier Transform on the video image data stored in the columns of the first frame and second frame buffers 70 and 72 respectively, thereby generating transform coefficients that are stored in the transform frame storage matrix 78.

A control circuit 92 is also provided to control the operations of the analog-to-digital converter 66, the digital switch 68, the multiplexer 74, the transform apparatus 76, and the transform coefficient selection device 80.

As shown in FIG. 7, a receiver frame storage matrix 94 is provided to store data received from the Transform Scaling Data Compressor 12 (FIG. 1) by way of the Multichannel Data Compressor 18 and the Multichannel Data Decompressor 24. The scaling filter 50 (FIG. 7) expands the received data to reestablish the original number of transform coefficients. The inverse transform device 52 performs an inverse mathematical transform on the expanded transform coefficients to acceptably reproduce the image data, which is then stored in an inverse transform frame storage matrix 96.

An inverse threshold selection device 54 explicates the amount of data stored in the inverse transform frame storage matrix 96 by setting all values below a threshold equal to zero and all values equal to or greater than the threshold equal to one. A digital-to-analog converter 98 converts a digital signal associated with data explicated by the inverse threshold selection device 54 to an analog video signal for input to the video display 56 (FIG. 3).

To simplify an explanation of the operation of the Transform Scaling Data Compressor 12 (FIG. 2) and the Transform Scaling Data Decompressor 26, a single frame of data representing a video image will be traced from its production by the video detector 44 to its reproduction by the video display 56 (FIG. 3).

When directed at a scene, the video camera 60 of FIG. 4 focuses an image of the scene onto its retina 62. The retina 62 is effectively constructed of a matrix of cells, 64 in this example, arranged in rows and columns of 8 cells each. The cells might be, for example, photodiode-type devices that produce electrical voltages proportional to the intensity of light striking them. Shown in FIG. 8 is a representation of analog video voltage levels representing a single frame of video image data.

The cells of the retina 62 are scanned by the video circuit 64 to produce an analog video signal. The analog video signal is digitized by the analog-to-digital converter 66, shown in FIG. 5; and a portion of the digitized signal representing a first video frame is input to the single-pole-double-throw digital switch 68. The digital switch 68 inputs the digitized signal to the first frame buffer 70, which has the same number of cells, in the same relative positions, as the camera retina 62 (FIG. 4). A representation of the digitized signal stored in the first frame buffer 70 (FIG. 5) is shown in FIG. 9. In this example, the analog voltages are digitized to 16 levels, or 4 bits. A digitized signal representing a second video frame would be input to the second frame buffer 72. A digitized signal representing a third video frame would be input to the first frame buffer 70, and so on.

Digitized signals stored in the first and second frame buffers 70 and 72 respectively are multiplexed by the multiplexer 74 and input to the transform apparatus 76. As shown in the detailed block diagram of the transform apparatus 76 in FIG. 6, the digitized signals are input through the row pixel counter 88 to the row vector signal processor 82. Under control of the transform controller 86, and using the temporary pixel storage device 90 to store data during the ensuing transform operation, a one-dimensional Discrete Fourier Transform is performed on each of the eight rows of video image data values by the row vector signal processor 82; and a one-dimensional Discrete Fourier Transform is performed on each of the eight columns of video image data values by the column vector signal processor 84. The transformed values are then stored, in corresponding cells, in the transform frame storage matrix 78 shown in FIG. 5. A representation of the two-dimensionally transformed values stored in the transform frame storage matrix 78 is shown in FIG. 10.

A certain number of the transform coefficients stored in the transform frame storage matrix 78 (FIG. 5) are eliminated according to an established threshold by the transform coefficient selection device 80. As illustrated by the representation of the sample thresholded transform coefficients shown in FIG. 11, 44 of the original 64 transform coefficients have been eliminated and only 20 remain. Zeros have been placed in the cells corresponding to eliminated transform coefficients.

As shown in FIG. 1, output signals from the Transform Scaling Data Compressor 12 are compressed and multiplexed by the Multichannel Data Compressor 18 and transmitted by the transmitter 20. The transmitted signals are received by the receiver 22, demultiplexed and decompressed by the Multichannel Data Decompressor 24, and input to the Transform Scaling Data Decompressor and Image Processor 26.

Within the Transform Scaling Data Decompressor and Image Processor 26, the received transform coefficients are input to the receiver frame storage matrix 94, shown in FIG. 7, and stored in corresponding cells. Again, zeros are placed in the cells corresponding to eliminated transform coefficients. Ideally, the received transform coefficients would be the same as those transmitted and would also be illustrated by the representation of the sample transform coefficients shown in FIG. 11.

In a more conventional transform data decompressor, the received transform coefficients would be inversely transformed by the inverse transform device 52 (FIG. 7) and input to the inverse transform frame storage matrix 96. The reproduced values would typically be input to the video display device 56, shown in FIG. 3, to display a constructive reproduction of the original video image. The representations of the inversely transformed values are shown in FIG. 12. The inversely transformed values would ideally be the same as those illustrated in FIG. 9; but, due to the imperfect fidelity attending the thresholding process, the values actually reproduced will not be identical. This is illustrated by differences between the representations of sample values shown in FIG. 9 and the representations of the reproductions thereof shown in FIG. 12.

It is important at this point in the operation description to note the fact that, in a conventional transform data compressor, the size of the image as represented by the digitized video image data stored in the first frame buffer 70, and illustrated in FIG. 9, and the size of the image as represented by the digitized video image data stored in the inverse transform frame storage matrix 96, and illustrated in FIG. 12, are the same.

As an aid in describing the unique compression and scaling features and the operation of the Transform Scaling Data Compressor 12 and the Transform Scaling Data Decompressor and Image Processor 26, a single frame of video image data representing an image of a numeric character "9" will be traced from its production by the video detector 44 (FIG. 2) to its reproduction by the video display 56 (FIG. 3). The character is assumed to be black on a white background and to be detected by video transducers with a gray scale resolution of one bit; i.e., the transducers are capable of detecting only black and white.

The illustrative video image data frame will be assumed to comprise 256 pixels arranged in a 16-by-16 matrix, and each pixel will be represented only by a one or a zero to indicate black and white respectively. An actual video image data frame, of course, would contain a much greater number of pixels, typically 262,144 arranged in a 512-by-512 matrix; and each pixel would assume many more than two values, typically as many as 256 gray scale levels.

When directed at the nine, the video camera 60 of FIG. 4 focuses an image of the nine onto its retina 62. The 256 cells of the retina 62 are scanned by the video circuit 64 to produce an analog video signal. The analog video signal is digitized by the analog-to-digital converter 66, shown in FIG. 5; and a portion of the digitized signal representing a first video frame is input to the single-pole-double-throw digital switch 68. The digital switch 68 inputs the digitized signal to the first frame buffer 70, which has the same number of cells, in the same relative positions, as the camera retina 62, shown in FIG. 4. A representation of the digitized signal stored in the first frame buffer 70 is shown in FIG. 13

In this example, the analog voltages are digitized to 2 levels, or 1 bit. As in the previous example, a digitized signal representing a second video frame would be input to the second frame buffer 72 (FIG. 5). A digitized signal representing a third video frame would be input to the first frame buffer 70, and so on.

Digitized signals stored in the first and second frame buffers 70 and 72 respectively are multiplexed by the multiplexer 74 and input to the transform apparatus 76. As shown in the detailed block diagram of the transform apparatus 76 in FIG. 6, the digitized signals are input through the row pixel counter 88 to the row vector signal processor 82. Under control of the transform controller 86, and using the temporary pixel storage device 90 to store data during the ensuing transform operation, a one-dimensional Discrete Fourier Transform is performed on each of the 16 rows of video image data values by the row vector signal processor 82; and a one-dimensional Discrete Fourier Transform is performed on each of the 16 columns of video image data values by the column vector signal processor 84. The transformed values are then stored, in corresponding cells, in the transform frame storage matrix 78 shown in FIG. 5. A representation of the two-dimensionally transformed values stored in the transform frame storage matrix 78 is shown in FIG. 14.

Using a Fourier Transform, as in this example, the transformed values are complex numbers with a real and an imaginary value for each cell. It should be understood, however, that there are transforms (orthogonal functions) that yield only a real value transform for a real value input function. The Fourier Transform is used because of the ease with which it can be mathematically implemented. The matrix of values shown in FIG. 14 are disposed with the real part printed above the imaginary part. To provide a convenient illustration, actual transform values have been truncated to produce integral values.

Since image energy is usually uniformly distributed in the spatial domain and tends to concentrate near the origin of a Fourier domain, the image energies of a substantial number of higher spacial frequency components have very low magnitudes. The exclusion of these components from the transmitted data has an acceptably minimal effect on the reconstructed image and permits a significant reduction in the bandwidth required to transmit the data.

The acceptability of a reconstructed image is, of course, determined by the ultimate use of the image. The recognition of large objects in an image would naturally not require an image having as much resolution as would the recognition of small objects.

A certain number of the transform coefficients stored in the transform frame storage matrix 78, shown in FIG. 5, are eliminated according to an established threshold by the transform coefficient selection device 80. In the present example, all values in the transform frame storage matrix are set to zero except those in rows 0 through 7 and columns 0 through 7. The latter area is shown highlighted in FIG. 14 by cross-hatching. Thus, 192, or seventy-five percent, of the original 256 transform coefficients have been eliminated. Only 64 remain, and they contain adequate information to reconstruct a recognizable nine.

It should be noted at this point that, with respect to the compressor portions of transform data compressors, it is the transform coefficient thresholding technique just described that represents the primary difference between the compressor portion of the present invention and the compressor portions of conventional transform data compressors.

As shown in FIG. 1, output signals from the Transform Scaling Data Compressor 12 are compressed and multiplexed by the Multichannel Data Compressor 18 and transmitted by the transmitter 20. The transmitted signals are received by the receiver 22, demultiplexed and decompressed by the Multichannel Data Decompressor 24, and input to the Transform Scaling Data Decompressor and Image Processor 26.

The received transform coefficients are input to the receiver frame storage matrix 94, shown in FIG. 7, and stored in corresponding cells. Ideally, the received transform coefficients would be the same as those transmitted and would be illustrated by the representation of the sample transform coefficients shown in the cross-hatched area in FIG. 14. Zeros would be placed in the cells corresponding to eliminated transform coefficients.

The scaling filter 50 (FIG. 7) spreads the received transform coefficients stored, as illustrated by the cross-hatched area in FIG. 14, in the eight respective rows and columns of the receiver transform storage matrix 94 by inserting zeros in alternate rows and columns, expanding the 8-by-8 matrix to a 16-by-16 matrix as shown in FIG. 15.

Figure 16:
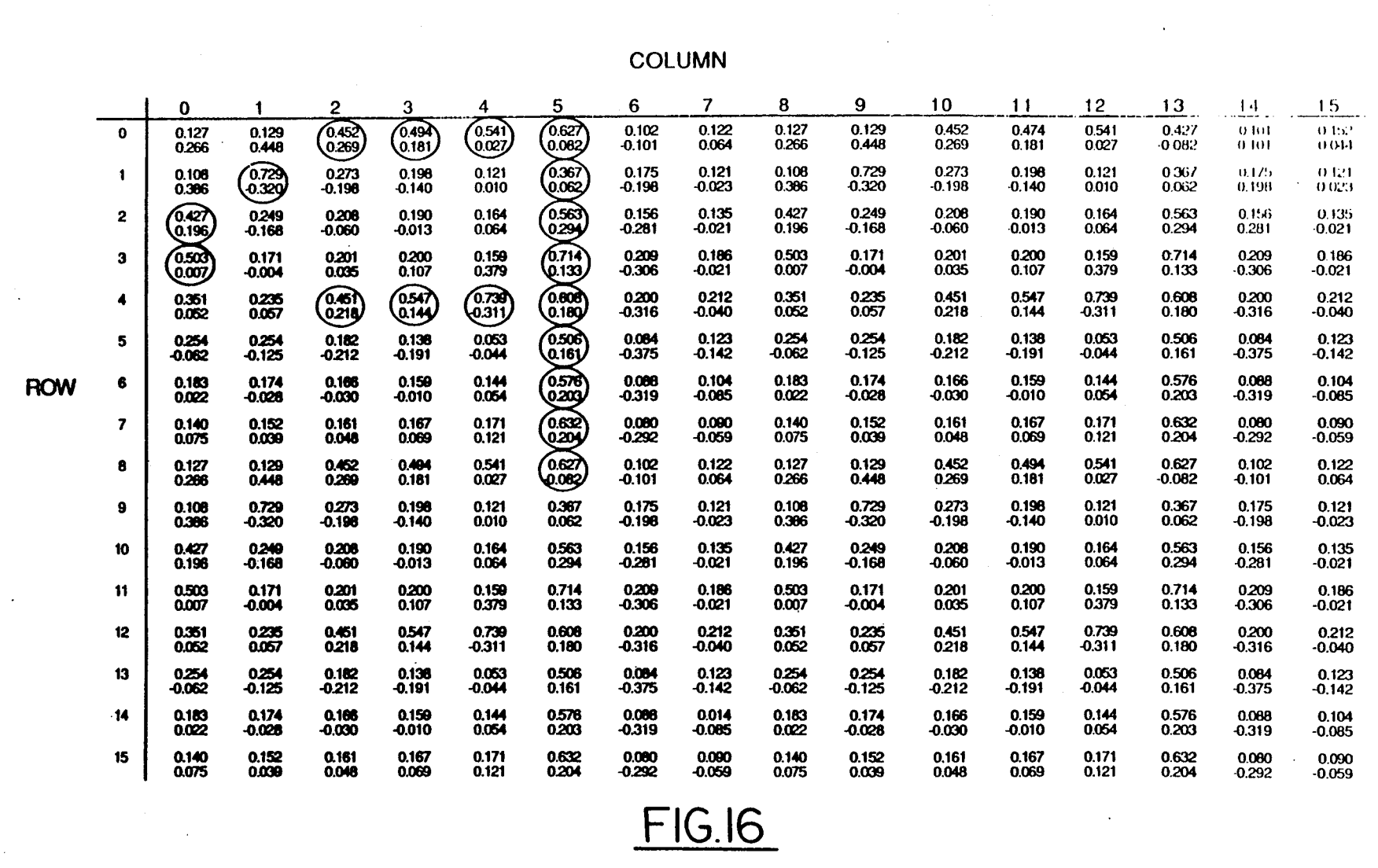

In the present invention, an inverse mathematical transform is performed at this point on the data shown in FIG. 13; and the inversely transformed values are stored in the inverse transform frame storage matrix 96 (FIG. 7) as shown in FIG. 16.

The data shown in FIG. 16 is interpreted in a more meaningful manner by choosing a threshold value between zero and one. The inverse threshold selection device 54 (FIG. 7) then sets all the values in the inverse transform frame storage matrix 96 that are less than the threshold value to zero and sets all those values that are equal to or greater than the threshold value to one. For example, the result of threshold selection using a threshold value of 0.4 is shown in FIG. 17. Note that, in this figure, each numeral "1" has been replaced by a "§" symbol to provide a more graphic display.

A digital-to-analog converter 98 (FIG. 7) converts digital signals associated with data explicated by the inverse threshold selection device 54 to an analog video signal. The video display 56, shown in FIG. 3, receives the analog video signal and provides a constructive reproduction of the video images converted by the video detector 44, shown in FIG. 2, into electrical, video image data.

An image processor 58, shown in FIG. 7, also receives data from the inverse threshold selection device 54 and performs therewith tasks including potential target identification, edge detection and map data manipulation and storage.

The result shown in FIG. 17 is predicted by the Scaling Theorem of Fourier Transform Theory. The scaling process performed by the scaling filter 50 (FIG. 7) is equivalent to an expansion in the "frequency domain," and the inverse transform process performed by the inverse transform device 52 yields a compression in the "time domain."

Of major significance is the fact that the amount of data representing the compressed image of the numeral "9" stored in one quarter of the 16-by-16 matrix shown in FIG. 17 is sufficient (in the context of Shannon's Formula, which is a theorem in information theory that states that a method of coding exists whereby C binary digits per second may be transmitted with arbitrarily small frequency of error, where C is given by $$C = B \log_2(1 + (S/N))$$

and no higher rate can be transmitted, B being the bandwidth and (S/N) being the signal-to-noise ratio) to enable an acceptable recognition of the character. In this example, the task of character recognition could be reduced by using only an 8-by-8 matrix to contain the transmitted character instead of the original 16-by-16 matrix. Not only has the original data been compressed; but, by effectively "compressing" the image, the amount of information needed to perform recognition processing has also been reduced.

As previously mentioned, a Delta Modulation (DM) system is effectively a differential Pulse Code Modulation (PCM) system. In a PCM system, an n-digit binary code is used to transmit data. In a DM system, a single-digit code is used. Transmitted pulses carry data corresponding to the derivative of the amplitude of the data function. Rather than transmitting an absolute signal amplitude at each sampling, a DM system transmits only the changes in signal amplitude from sampling instant to sampling instant. Upon reception, the pulses are integrated to obtain the original waveform.

Figure 18:
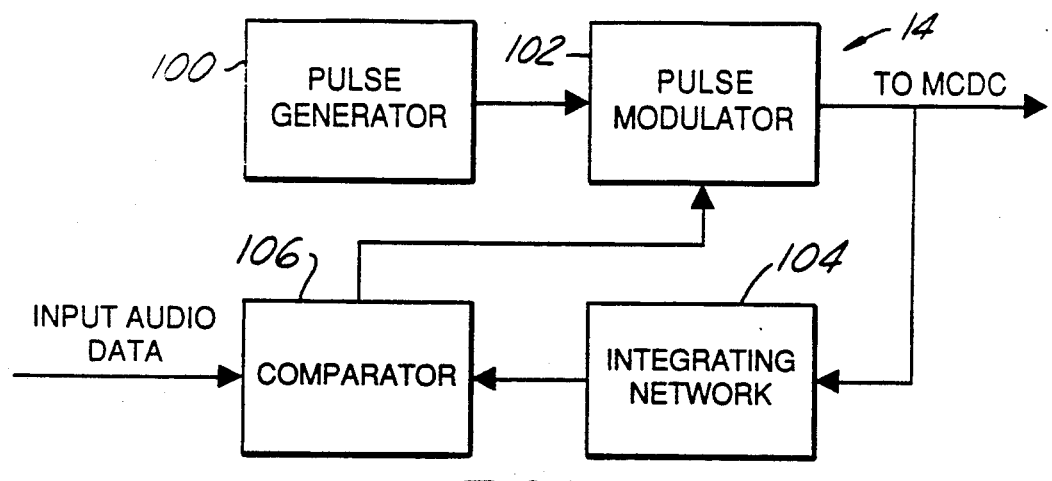
FIG. 18 is a block diagram showing another element of FIG. 1 in greater detail.

With reference to FIG. 18 of the drawings, the preferred embodiment of the Delta Modulation Data Modulator 14 basically includes a pulse generator 100, which generates clock pulses, and a pulse modulator 102 connected to the pulse generator 100 to receive the clock pulses and to generate positive output pulses in response thereto whenever the sign of a difference signal also received by the pulse modulator 102 is positive and to generate negative output pulses whenever the sign of the difference signal received is negative.

The DM Data Modulator 14 also includes a feedback loop including an integrating network 104 connected to the pulse modulator 102 to receive output pulses therefrom and to generate a synthesized signal in response thereto. The feedback loop also includes a comparator 106 connected between the integrating network 104 and the pulse modulator 102. An audio data signal is input to the comparator 106 and is thereby compared with the synthesized signal generated by the integrating network 104, the comparator 106 generating the difference signal in response to the difference between the audio data signal and the synthesized signal.

As mentioned, the sign of the difference signal determines the sign of the output pulses generated by the pulse modulator 102. This compensates for the difference between the audio data signal and the synthesized signal voltages, effectively reducing the difference so that the overall configuration of the synthesized signal, which is in the form of a step wave, substantially coincides with that of the audio data signal.

As shown in FIG. I, output signals from the Delta Modulation Data Modulator 14 are compressed and multiplexed by the Multichannel Data Compressor 18 and transmitted by the transmitter 20. The transmitted signals are received by the receiver 22, demultiplexed and decompressed by the Multichannel Data Decompressor 24, and input to the Delta Modulation Data Demodulator 28.

Figure 19:
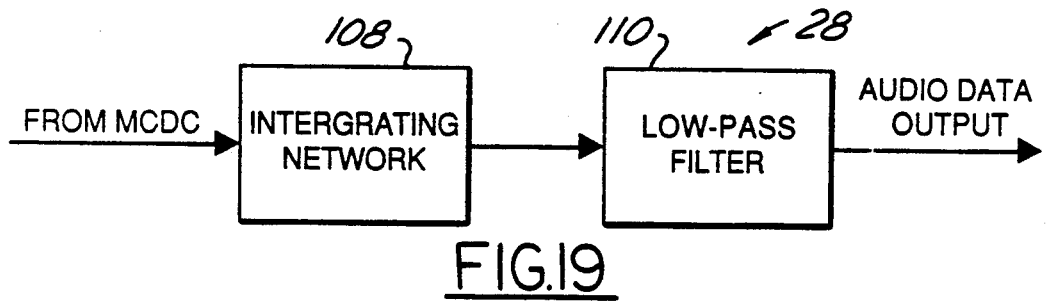
FIG. 19 is a block diagram showing another element of FIG. 1 in greater detail.

As shown in FIG. 19 of the drawings, the preferred embodiment of the Delta Modulation Data Demodulator 28 basically includes an integrating network 108 and a low-pass filter 110. The output pulses received from the pulse modulator 102 are input to the integrating network 108, which generates a signal, comparable to the synthesized signal, comprising the original audio data signal plus noise components resulting from sampling. The low-pass filter 110 substantially removes the noise components, leaving a reconstruction of the original audio data signal.

Although a Delta Modulation Data Modulator has an advantage of including simpler and less expensive circuits than does a Pulse Code Modulator, the former is not capable of transmitting direct-current signals, its dynamic range and signal-to-noise ratio are inversely proportional to signal frequency, and receiver integration causes an accumulative error in the demodulated signal whenever the system is subjected to transmission disturbances such as noise. The Delta-Sigma Modulation (D-SM) Data Modulator 16 has been included to provide for the transmission of digital signals, to provide stable performance and to provide signal-to-noise ratio independence from signal frequency.

Figure 20:
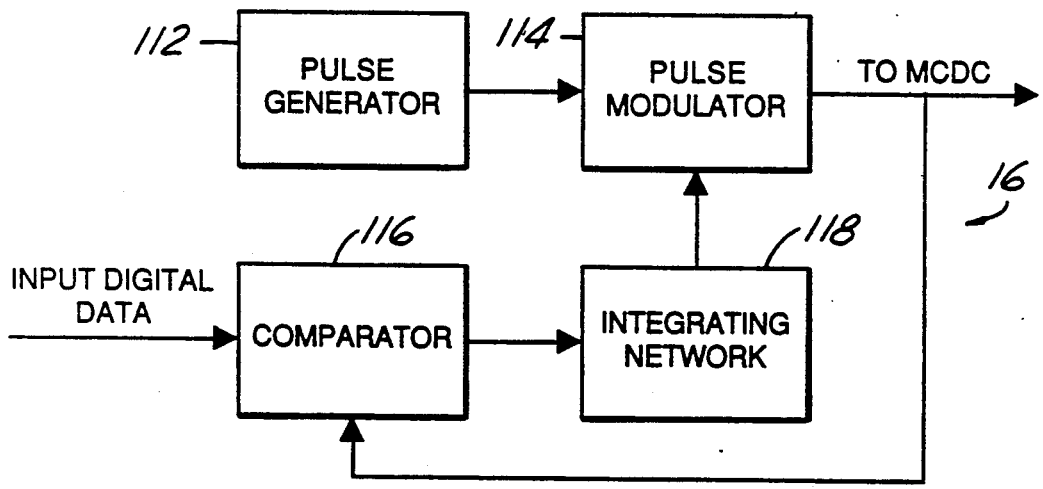
FIG. 20 is a block diagram showing another element of FIG. 1 in greater detail.
Figure 21:
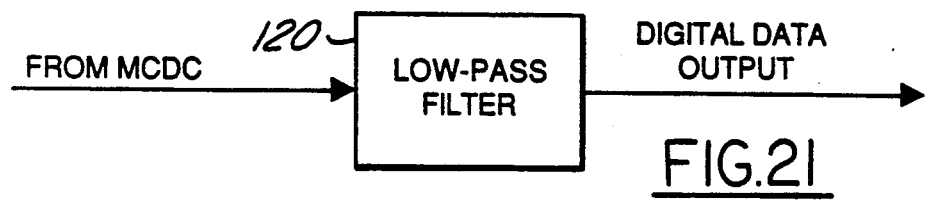
FIG. 21 is a block diagram showing another element of FIG. 1 in greater detail.

With reference to FIG. 20 of the drawings, the preferred embodiment of the D-SM Data Modulator 16 basically includes a pulse generator 112, which generates clock pulses, and a pulse modulator 114 connected to the pulse generator 112 to receive the clock pulses and to generate positive output pulses in response thereto whenever the amplitude of an integrated difference signal also received by the pulse modulator 114 is positive, that is, when the integrated difference signal is greater than a predetermined pulse modulator reference level, and to generate no output pulses whenever the sign of the integrated difference signal received is negative.

The D-SM Data Modulator 16 also includes a feedback loop including a comparator 116 connected to the pulse modulator 114 to receive output pulses therefrom. A digital data signal is input to the comparator 116 and is thereby compared with the output pulses received from the pulse modulator 114, the comparator 116 generating a difference signal in response to the difference between the digital data signal and the output pulses. The feedback loop also includes an integrating network 118 to receive the difference signal from the comparator 116 and generate the integrated difference signal in response thereto.

As mentioned, the sign of the integrated difference signal determines whether or not output pulses are generated by the pulse modulator 114. As a consequence of this negative feedback process, the integrated difference signal level is maintained near the pulse modulator reference level. As the amplitude of the digital data signal increases, the number of output pulses increases; therefore, data corresponding to the amplitude of the input digital data signal is conveyed by the output pulses.

As shown in FIG. 1, output signals from the Delta-Sigma Modulation Data Modulator 16 are compressed and multiplexed by the Multichannel Data Compressor 18 and transmitted by the transmitter 20. The transmitted signals are received by the receiver 22, demultiplexed and decompressed by the Multichannel Data Decompressor 24, and input to the Delta-Sigma Modulation Data Demodulator 30.

Since no integration is required to demodulate the output pulses from the D-SM Data Modulator 16, the preferred embodiment of the D-SM Data Demodulator 30 basically includes only a low-pass filter 120. The output pulses received may be input directly to the low-pass filter 120 for demodulation. Since the demodulation process requires no integration, no accumulative error due to transmission disturbances will be present in the demodulated signal, which is a reconstruction of the original digital data signal.

With reference to FIG. 1 of the drawings, the Multichannel Data Compressor 18 is shown having inputs from the Transform Scaling Data Compressor 12, the Delta Modulation Data Modulator 14, and the Delta-Sigma Data Compressor 16 and having an output to a transmitter 20. These devices are provided to compress, modulate and multiplex analog video, analog audio and digital data at a remote site and to transmit the data to a base site. The transmitter 20 may be a radio transmitter as shown, a wire transmitter such as a telephone communication link, or a fiber optic communication link.

At the base site, the Multichannel Data Decompressor 24 is shown having an input from the receiver 22 and outputs to the Transform Scaling Data Decompressor 26, the Delta Modulation Data Demodulator 28, and the Delta-Sigma Data Demodulator 30. Although the preferred embodiment is illustrated and described with reference to a system having three information sources, it is to be understood that the concept of the Multiformat Data Compression and Transmission system disclosed is not limited to this number.

A similar, reversed arrangement of components shown includes another Multichannel Data Compressor 34 having an input from the Delta Modulation Data Modulator 32 and having an output to a transmitter 36 to modulate and compress audio data at the base site and to transmit the data to the remote site. At the remote site, another multichannel Data Decompressor 40 is shown having an input from the receiver 38 and an output to the Delta Modulation Data Modulator 42. It is to be understood that data from a greater number of sources may be transmitted using the concept of the Multichannel Data Compressor.

Figure 22:
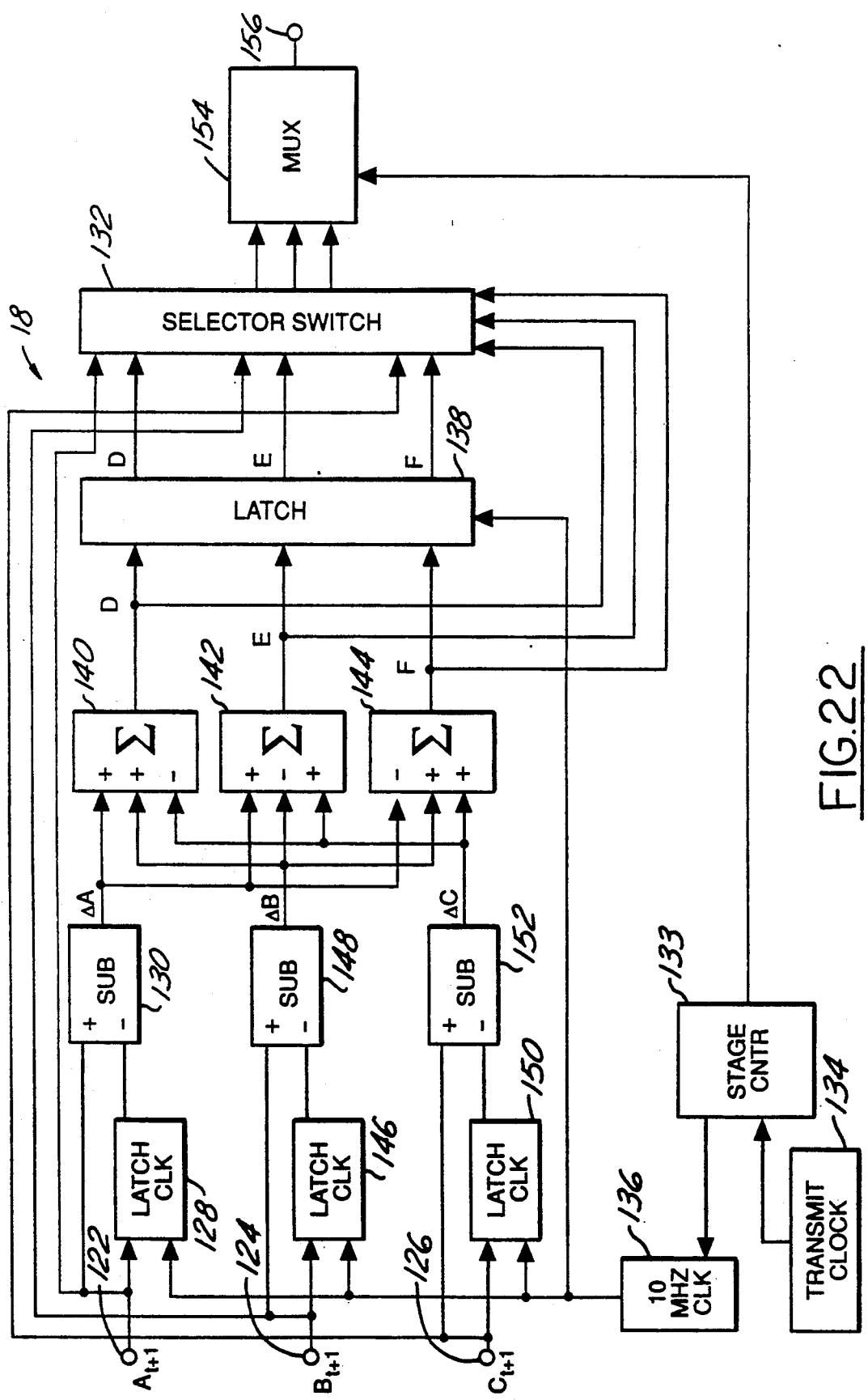
FIG. 22 is a circuit diagram showing another element of FIG. 1 in greater detail.

The Multichannel Data Compressor 18 is shown in FIG. 22. The video data "A" corresponding to the output of the Transform Scaling Data Compressor (TSDC) 12 is received at an input terminal 122. In a like manner, the audio data "B" corresponding to the output of the Delta Modulation Data Modulator (DMDM) 14 is received at an input terminal 124; and the digital data "C" corresponding to the output of the Delta-Sigma Data Modulator (D-SDM) 16 is received at an input terminal 126.

The absolute value of data A received at the input terminal 122 is communicated directly to a data latch 128, to a positive input of a difference circuit 130 and to a selector switch 132. The latch 128 stores the absolute value of data A for one data cycle. The value of data A stored in the data latch 128, hereinafter identified as data $A_t$, is transmitted to the negative input of the difference circuit 130 in response to a transmit clock signal generated by an 18-stage counter 133 and a transmit clock 134 in synchronization with the receipt of a subsequent absolute value, data $A_{t+1}$ of data A. A 10-megaHertz clock 136 times the data in and out of the data latches 128, 146, and 150 and in and out of a composite data latch 138 in a conventional manner.

The difference circuit 130 subtracts the value of $A_t$ from the value of $A_{t+1}$ to produce difference data value delta A, which is the difference between the current value $(A_{t+1})$ and the preceding value $(A_t)$ of data A. The output of the difference circuit 130 is connected to a positive input of each of the sum circuits 140 and 142 and a negative input of the sum circuit 144.

In a like manner, the input terminal 124, which receives the absolute value of data B, is connected to the input of a data latch 146, to the positive input of a difference circuit 148, and to the selector switch 132. The data latch 146 stores the absolute value of data B for one data cycle and transmits the data B, referred to as data $B_t$ to the difference circuit 148 in synchronization with the next iteration, data $B_{t+1}$ of data B. The difference circuit 148 subtracts $B_t$ from $B_{t+1}$ to generate difference data value delta B, which is the difference between the current value $(B_{t+1})$ and the preceding value $(B_t)$ of data B. The difference data value delta B is applied to a positive input of each of the sum circuits 140 and 144 and to a negative input of the sum circuit 142.

The input terminal 126 is connected to the input of data latch 150, to the positive input of difference circuit 152, and to the selector switch 132. The data latch 150 stores the absolute value of data C as $C_t$, which is transmitted to the negative input of difference circuit 152 in synchronization with the next iteration, data $C_{t+1}$ of data C. The difference circuit 152 subtracts $C_t$ from $C_{t+1}$ to generate difference data value delta C, which is the difference between the current value $(C_{t+1})$ and the preceding value $(C_t)$ of the data C. The difference data delta C is transmitted to a positive input of each of the sum circuits 142 and 144 and to a negative input of the sum circuit 140.

The sum circuit 140 generates composite data value D, which is the sum of difference data values delta A, delta B, and delta C where:

$$D = delta\ A + delta\ B - delta\ C$$

In a like manner, the outupt of sum circuit 142 is composite data E where:

$$E = delta\ A - delta\ B + delta\ C$$

and the output of sum circuit 144 is composite data F where:

$$F = delta\ B + delta\ C - delta\ A$$

The outputs of the sum circuits 140, 142, and 144 are connected to the composite data latch 138, which independently stores the composite data values D, E, and F. The outputs of the sum circuits 140, 142, and 144 are also connected to the selector switch 132 and are used to determine whether the composite data values D, E, and F or the absolute values $A_{t+1}$, $B_{t+1}$ and $C_{t+1}$ are to be transmitted by the transmitter 20, shown in FIG. 1, as shall be explained with reference to FIG. 23.

The composite data latch 138 has three outputs, one for each of the three composite data values D, E, and F, which are directly connected to the selector switch 132. As previously discussed, the absolute values data $A_{t+1}$, $B_{t+1}$, and $C_{t+1}$, received at input terminals 122, 124 and 126 are also transmitted to selector switch 132. The selector switch 132 selects for transmission either the absolute values of the received data $A_{t+1}$, $B_{t+1}$, and $C_{t+1}$ or the composite data values D, E, and F depending upon the magnitude of the composite data D, E or F. If the magnitude of any one of the composite data D, E or F exceeds a predetermined value, the absolute value of the data $A_{t+1}$, $B_{t+1}$ or $C_{t+1}$ is transmitted; otherwise, the composite data D, E and F is transmitted.

The output of the selector switch 132 is connected to a multiplexer 154, which assembles the data received from the selector switch 132 into a predetermined format. The multiplexer 154 then serially transfers this data to the transmitter 20, shown in FIG. 1, through an output terminal 156.

Figure 23:
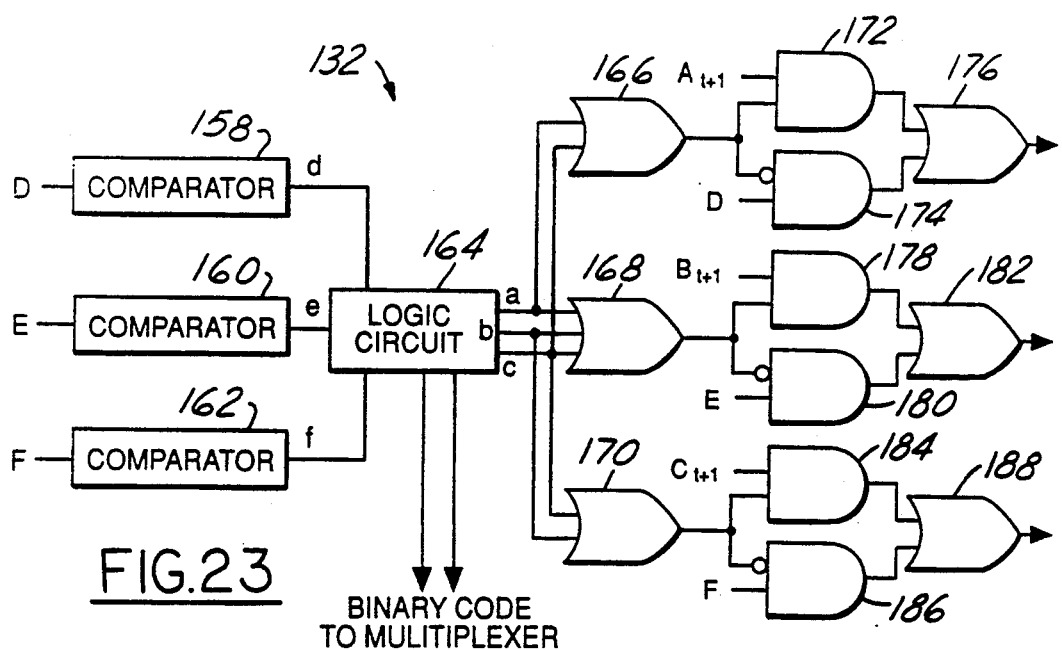
FIG. 23 is a circuit diagram used to explain the function of another element shown in FIG. 1.

The logical function of the selector switch 132 is shown in FIG. 23. The composite data values D, E and F are received, respectively, by a set of comparators 158, 160 and 162. Each of these comparators compares the magnitude of the composite data value, for example, the number of bits, with a predetermined value and generates an output when the composite data value exceeds the predetermined value. The outputs of comparators 158, 160 and 162 are received by a logic circuit 164. The logic circuit 164 has a first output "a," which is connected to inputs of logical OR gates 166 and 168, a second output "b," connected to logical OR gates 168 and 170, and a third output "c," which is connected to logical OR gates 166 and 170. The logic circuit 164 also generates a 2-bit digital code, which is transmitted to the multiplexer 154, shown in FIG. 22, identifying the data to be transmitted.

Table I is a truth table for the logic circuit 164 as a function of the outputs of comparators 158, 160 and 162 in response to the composite data values D, E and F received from the sum circuits 140, 142, and 144, shown in FIG. 22.

TABLE 1

Truth Table For Logic Circuit 164

| Comparator Outputs | | | Digital Code | Logic Circuit Output | Data To Be Transmitted |
|---|---|---|---|---|---|
| d | e | f | | | |
| 0 | 0 | 0 | 00 | None | D, E, F |
| 1 | 0 | 0 | 01 | a | $A_{t+1} B_{t+1}$ |
| 0 | 1 | 0 | 01 | a | $A_{t+1} B_{t+1}$ |
| 0 | 0 | 1 | 10 | c | $A_{t+1} C_{t+1}$ |
| 1 | 0 | 1 | 10 | c | $A_{t+1} C_{t+1}$ |
| 1 | 1 | 0 | 01 | a | $A_{t+1} B_{t+1}$ |
| 0 | 1 | 1 | 11 | b | $B_{t+1} C_{t+1}$ |
| 1 | 1 | 1 | 01/10 | a/c | $A_{t+1} B_{t+1}$/ $A_{t+1} C_{t+1}$ |

This truth table is based on the assumption that the priority of data C is less than the priority of data B and that the priority of data B is less than the priority of data A. When the outputs d, e and f of all three comparators are logical 1's, the logic circuit 164 sequentially generates digital codes 01 and 10 such that the absolute values of $A_{t+1}$ and $B_{t+1}$ and $A_{t+1}$ and $C_{t+1}$ will be transmitted in the next two transmissions.

Referring to FIGS. 22 and 23, the OR gate 166 is connected to one input of a logical AND gate 172 and to the inverting input of a logical NAND gate 174. The absolute value of data $A_{t+1}$ is received at the other input of the AND gate 172, and the composite data value D is received at the noninverting input of the NAND gate 174. The outputs of the AND gate 172 and the NAND gate 174 are connected to the inputs of a logical OR gate 176, the output of Which is connected to the multiplexer 154.

In a like manner, the output of the OR gate 168 is connected to one input of a logical AND gate 178 and to the inverting input of a logical NAND gate 180. The absolute value of $B_{t+1}$ is received at the other input of the AND gate 178, and the composite data value E is received at the noninverting input of the NAND gate 186. The outputs of the AND gate 178 and the NAND gate 186 are connected to a logical OR gate 182, the output of which is connected to the multiplexer 154.

Similarly, the output of the logical OR gate 170 is connected to one input of a logical AND gate 184 and to the inverting input of a logical NAND gate 186. The absolute value of $C_{t+1}$ is received at the other input of the AND gate 184, and the composite data value F is received at the noninverting input of the NAND gate 186. The outputs of the AND gate 184 and the NAND gate 196 are connected to a logical OR gate 188, the output of which is connected to the multiplexer 154.

The operation of the selector switch 132 is as follows. If the outputs d, e and f of the comparators 158, 160 and 162 are all logical O's, the outputs a, b, and c of the logic circuit 164 are all logical O's, thus disabling the AND gates 172, 178 and 184 and enabling the NAND gates 174, 180 and 186. In this state, the selector sWitch 132 transmits the composite data values D, E, and F, currently stored in the latch 138, to the multiplexer 154. The logic circuit 164 also generates a digital code 00, which is also transmitted to the multiplexer 154 with the composite data. The multiplexer 154 multiplexes the composite data values D, E and F and the binary code to form an 18-bit compressed data word that is transferred to the transmitter 20, shown in FIG. 1, in response to signals received from the 18-stage counter 133.

If the outputs d, e, or both d and e of the comparators 158 and 160 are logical 1's, then the output "a" of the logic circuit 164 becomes a logical 1, enabling the AND gates 172 and 178 to pass the absolute data values $A_{t+1}$ and $B_{t+1}$ to the multiplexer 154 through the OR gates 176 and 182 respectively and disabling the NAND gates 174 and 180. The logic circuit 164 also forwards the binary code 01 to the multiplexer 154 indicating that the absolute data $A_{t+1}$ and $B_{t+1}$ are to be transmitted.

If the outputs e and f of the comparators 160 and 162 are logical 1's, the output "b" of the logic circuit 164 becomes a logical 1, enabling the AND gates 178 and 184 to pass the absolute data $B_{t+1}$ and $C_{t+1}$ to the multiplexer 154 and disabling the NAND gates 180 and 186. The logic circuit 164 also generates the code 11, indicating that the absolute data $B_{t+1}$ and $C_{t+1}$ are to be transmitted.

If the output "f" or the outputs d and f of the comparators 158 and 162 are logical 1's, the output c of the logic circuit 164 becomes a logical 1, enabling the AND gates 172 and 184 to pass the absolute data $A_{t+1}$ and $C_{t+1}$ to the multiplexer 154 and disabling the NAND gates 174 and 186. The logic circuit 164 then generates the code 10 indicating that the absolute Values of data $A_{t+1}$ and $C_{t+1}$ are to be transmitted.

If the outputs "d", "e", and "f" of the comparators 158, 160, and 162 are all logical 1's, the output "a" of the logic circuit 164 first becomes a logical 1, enabling the AND gates 172 and 178 to pass the absolute data $A_{t+1}$ and $B_{t+1}$ to the multiplexer 154; and the logic circuit 164 simultaneously transmits the code 01 to the multiplexer 154, indicating that the absolute data $A_{t+1}$ and $B_{t+1}$ are to be transmitted. After the transmission of $A_{t+1}$ and $B_{t+1}$, the output "c" of the logic circuit 164 becomes a logical 1 enabling the AND gates 172 and 184 to pass the absolute data $A_{t+1}$ and $C_{t+1}$ to the multiplexer 154; and the logic circuit 164 simultaneously transmits the code 10 to the multiplexer 154, indicating that the absolute data $A_{t+1}$ and $C_{t+1}$ are to be transmitted.

Figure 24:
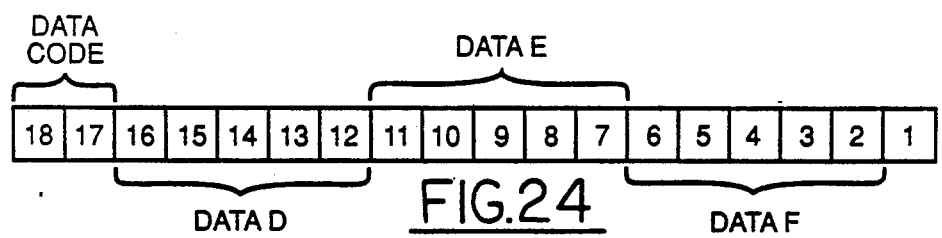
FIG. 24 shows the 18-bit format of a compressed data word transmitted by an element shown in FIG. 1.

The operation of the Multichannel Data Compressor 18 will now be discussed with reference to a specific example to illustrate the degree of data compressibility obtainable. In this example, the digital data values A, B, and C received from their respective sources is in the form of an 8-bit byte; and the compressed data transmission by the transmitter 20, shown in FIG. 1, is in the form of an 18-bit word, as shown in FIG. 24, in which the least significant bit is bit 1. The most significant bits, bits 18 and 17 are a binary code, such as 00, identifying the message as a compressed data message containing composite data values D, E and F. Bits 16 through 12 contain composite data value "D", bits 11 through 7 contain composite data value "E" and bits 6 through 2 contain composite data value "F." In the event one or more of the compressed data values exceeds five bits, the logic circuit 164 initiates the transmission of the absolute values of data $A_{t+1}$, $B_{t+1}$ and $C_{t+1}$ as previously described.

Figure 25:
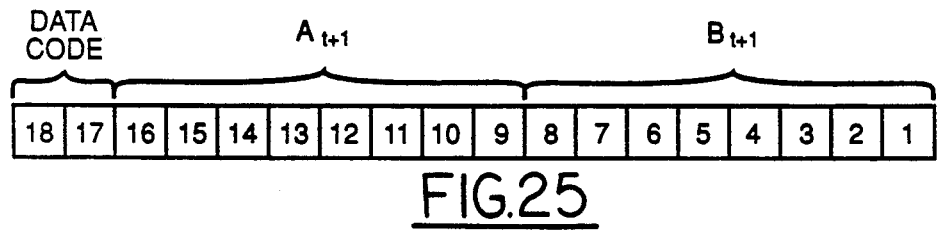
FIGS. 25 through 27 show the 18-bit format of different transmitted data value words transmitted by an element shown in FIG. 1.

FIG. 25 shows the data format for the transmission of the absolute values of data $A_{t+1}$ and $B_{t+1}$. Again, the most significant bits, 18 and 17, are a binary code such as 01, indicating that the data contained in the transmitted word contains the absolute values of data $A_{t+1}$ and $B_{t+1}$. The 8-bit value of absolute data $a_{t+1}$ is contained in bits 16 through 9 of the transmitted word, and the 8-bit value of absolute data $B_{t+1}$ is contained in bits 8 through 1.

Figure 26:
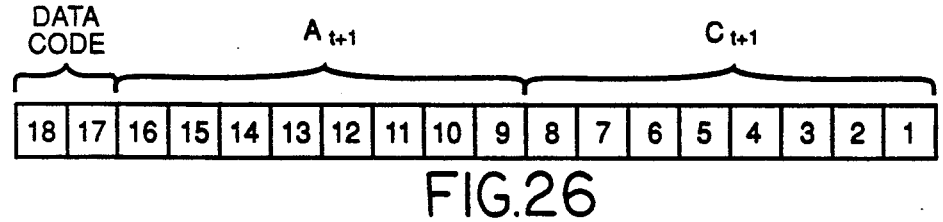
Figure 27:
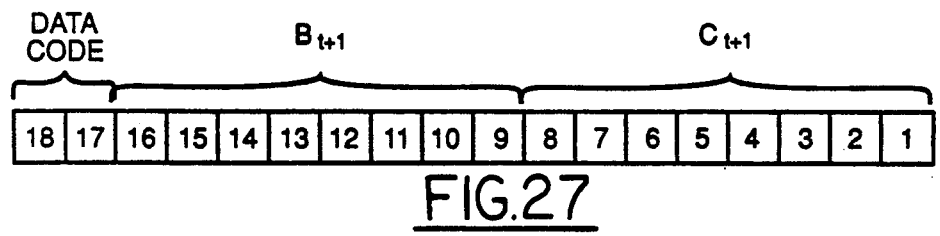

In a like manner, the transmission formats for the 8-bit values of absolute data $A_{t+1}$ and $C_{t+1}$ and of absolute data $B_{t+1}$ and $C_{t+1}$ are shown in FIGS. 26 and 27 respectively. As discussed relative to the transmission formats shown in FIGS. 24 through 27, bits 18 and 17 are a binary code identifying the type of data contained in the transmitted word. As is known in the art, the transmitter 20, shown in FIG. 1, may add parity bits to the beginning and/or end of the transmitted word to check the accuracy of the transmission.

Referring to FIG. 22, as the initial 8-bit absolute values of the data A, B, and C are received, they are temporarily stored in the data latches 128, 146, and 150 respectively. Since the initial content of the data latches 128, 146, and 150 are zero (0), the outputs delta A, delta B and delta C of the difference circuits 130, 148, and 152 are respectively equal to the absolute values of data A, data B and data C. As a result, the outputs of the sum circuits 140, 142, and 144 are normally greater than five bits; therefore, the selector switch 132 selects the absolute values of data A, B and C for the initial transmissions by the transmitter 20, shown in FIG. 1. As previously described, the transmitter 20 transmits two sequential messages, each containing different combinations of the absolute values of the data A, B and C such that all three absolute values of the data A, B and C are transmitted.

In a like manner, the next iteration data $A_{t+1}$, $B_{t+1}$ and $C_{t+1}$ are stored in the data latches 128, 146, and 150 respectively. Simultaneously, the data $A_t$, $B_t$ and $C_t$ previously stored in the data latches 128, 146, and 150 are subtracted from the values of data $A_{t+1}$, $B_{t+1}$ and $C_{t+1}$ in the difference circuits 130, 148, and 152 to produce difference data values delta A, delta B, and delta C. The difference data values delta A, delta B and delta C are then summed in sum circuit 140, 142, and 144 to generate the composite data values D, E and F, which are temporarily stored in composite data latch 138. If each of the composite data values D, E and F is five bits or less, the selector switch 132 passes the composite data values D, E and F from the composite data latch 138 to the multiplexer 154 for the next transmission. The multiplexer 154 formats the composite data in the compressed data format shown in FIG. 24, adds the data code bits in bit positions 18 and 17, and serially transmits the formatted compressed data word to the transmitter 20, shown in FIG. 1, for transmission.

If one or more of the compressed data D, E or F is larger than five bits, the selector switch 132 transfers the appropriate absolute values of $A_{t+1}$, $B_{t+1}$ or $C_{t+1}$ to the multiplexer 154, where it is formatted as required, as shown in FIGS. 25, 26 or 27, and forwarded to the transmitter 20, shown in FIG. 1, for transmission.

The effectiveness of the Multichannel Data Compressor 18 is obviously a function of how frequently absolute values of the data need to be transmitted. Table II shows the data compression ratio as a function of the frequency (% of time) of transmissions at which absolute values of data are sent.

TABLE II

Multichannel Data Compressor Compression Ratio

| Absolute Value Transmissions (% of time) | Average Bits Per Data Packet | Compression Ratio | Sampling Rate |
|---|---|---|---|
| 0 | 18.0 | 1.67 | 55.56 KHZ |
| 10 | 19.8 | 1.52 | 50.51 KHZ |
| 20 | 21.6 | 1.39 | 46.30 KHZ |
| 30 | 23.4 | 1.28 | 42.74 KHZ |
| 40 | 25.2 | 1.19 | 39.68 KHZ |
| 50 | 27.0 | 1.11 | 37.04 KHZ |
| 60 | 28.8 | 1.04 | 34.72 KHZ |
| 70 | 30.6 | 0.98 | 32.68 KHZ |
| 80 | 32.4 | 0.93 | 30.86 KHZ |
| 90 | 34.2 | 0.88 | 29.24 KHZ |
| 100 | 36.0 | 0.83 | 27.78 KHZ |

The data compression ratios listed on Table II are calculated on the basis that it takes 30 bits to transmit the uncompressed data from the three sources used in the embodiment shown in FIG. 1. The 30 bits include an 8-bit data value from each source plus a 2-bit data identification code that identifies the source of the data. The compression ratio when only composite data D, E, and F are being transmitted is $30/18 = 1.67$. For the sampling rate, it is assumed the transmitter is capable of transmitting 1,000K bits per second. The sampling rate (SR) for a conventional system is therefore:

$$SR = \frac{1,000,000 \text{ bits/second}}{30 \text{ bits/sample}} = 33,333 \text{ samples/sec.}$$

For the Multichannel Data Compressor, the sampling rate, SR (MCDC), when only compressed data is being transmitted is:

$$SR\ (MCDC) = \frac{1,000,000\ \text{bits/second}}{18\ \text{bits/sample}} = 55,556\ \text{samples/sec}.$$

As can be seen from Table II, the compression ratio decreases as the number of transmission of absolute values per unit of time increases. When absolute data values must be sent at least 70 percent of the time, the compression ratio becomes less than unity; and the effectiveness of the Multichannel Data Compressor is compromised. When the absolute data values are transmitted less than 30 percent of the time, however, the data compression is significant, resulting in a 28 to 67 percent increase in the sampling rate.

Figure 28:
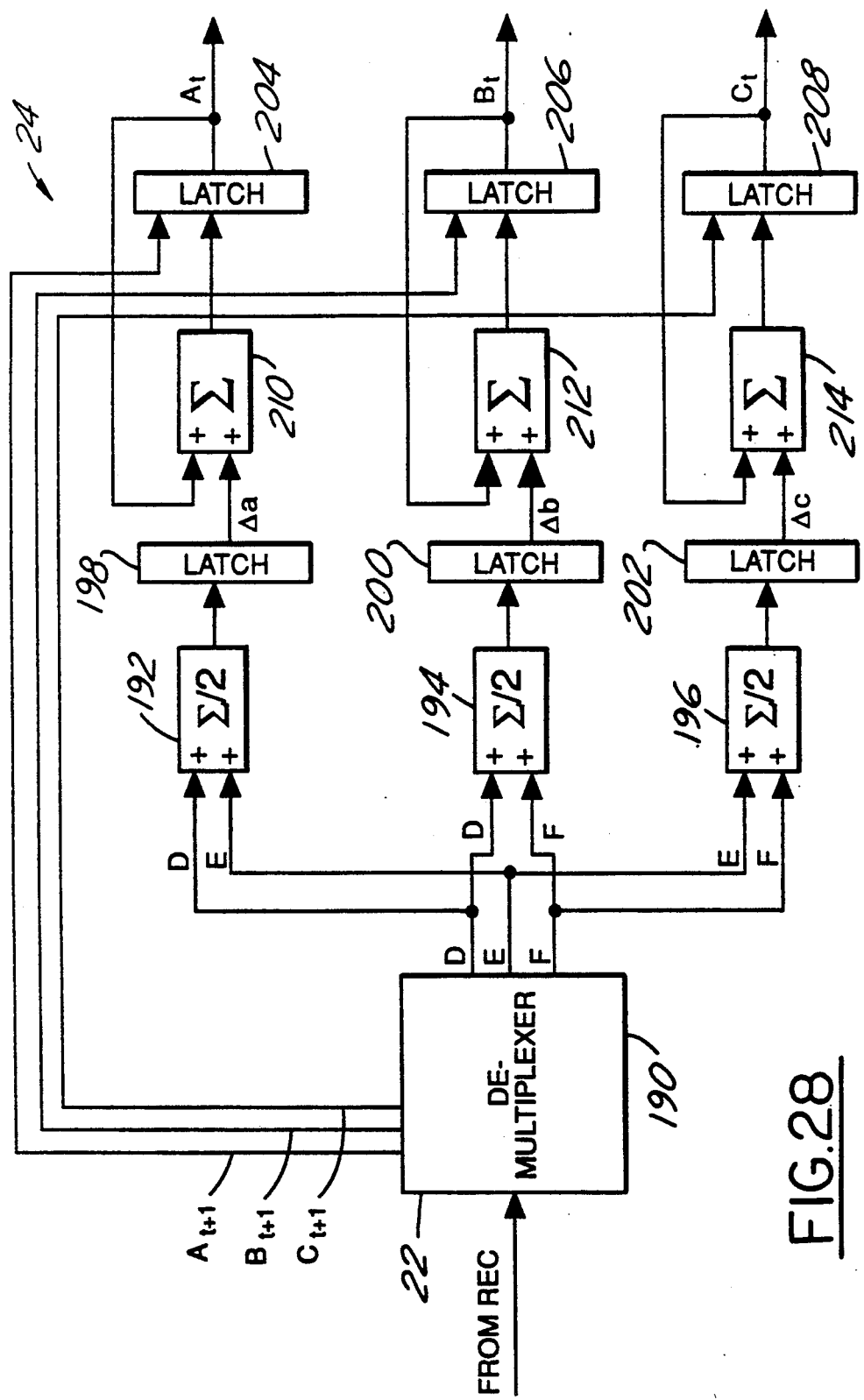
FIG. 28 is a circuit diagram showing an element of FIG. 1 in greater detail.

The details of the multichannel data decompressor (MCDD) 24 are illustrated in FIG. 28. A demultiplexer 190 decodes the binary code attached to each 18-bit word message received from the receiver 22, shown in FIG. 1, and demultiplexes the received data accordingly. For example, if the binary code is 00, indicating, as shown in Table I, that the received transmission contains composite data values D, E, and F, the demultiplexer 190 transfers the composite data values D, E, and F to sum amplifiers 192, 194 and 196 as shown. The sum amplifier 192 adds composite data values D and E and then divides the sum by 2 to produce a correction value delta a, which is equal to difference data value delta A, where:

$$(D+E)/2 = (\text{delta}\ A + \text{delta}\ B - \text{delta}\ C + \text{delta}\ A \\ - \text{delta}\ B + \text{delta}\ C)/2$$

$$(D+E)/2 = (2\text{delta}\ A)/2 = \text{delta}\ A = \text{delta}\ a$$

In a like manner, the sum amplifier 194 sums composite data values D and F to reproduce the correction value delta b, which is equal to difference data value delta B, where:

$$(D+F)/2 = (\text{delta}\ A + \text{delta}\ B - \text{delta}\ C - \text{delta}\ A \\ + \text{delta}\ B + \text{delta}\ C)$$

$$(D+F)/2 = (2\text{delta}\ B)/2 = \text{delta}\ B = \text{delta}\ b$$

The sum amplifier 196 sums composite data values E and F to produce a correction data value delta c, which is equivalent to difference data value delta C, where:

$$(E+F)/2 = (\text{delta}\ A - \text{delta}\ B + \text{delta}\ C - \text{delta}\ A \\ + \text{delta}\ B + \text{delta}\ C)/2$$

$$(E+F)/2 = (2\text{delta}\ C)/2 = \text{delta}\ C = \text{delta}\ c$$

The correction values delta a, delta b, and delta c, generated by the sum amplifiers 192, 194 and 196 respectively, are temporarily stored in correction data latches 198, 200 and 202 respectively.

Receiver data latches 204, 206 and 208 respectively store the values of the data $A_t$, $B_t$ and $C_t$ generated from the content of the preceding transmission received by the receiver 22, shown in FIG. 1. The value $A_t$ stored in the receiver data latch 204 is updated to the new value $A_{t+1}$ by adding, in a sum amplifier 210, the value of $A_t$ currently stored in the receiver data latch 204 to the correction data value delta a stored in the correction data latch 198. This new value of data $A_{t+1}$ is then stored in the receiver data latch 204 as the current value of data A. This process is substantially the reverse of the process used to generate the composite data values D, E, and F in the Multichannel Data Compressor 18, shown in FIG. 1.

In a like manner, the data Value B stored in the receiver data latch 206 is updated to its new value $B_{t+1}$ by adding, in a sum amplifier 212, the value of data $B_t$ currently stored in the receiver data latch 206 to the correction data value delta b stored in the correction data latch 200. The sum of $B_t$ and delta b is the value of data $B_{t+1}$, which is stored in the receiver data latch 206 as the current value of data B. The data value $C_{t+1}$ is generated by adding, in a sum amplifier 214, the correction data value delta c to the value of the data $C_t$ stored in the receiver data latch 208. The new value, data $C_{t+1}$, is then stored in the receiver data latch 208 as the current value of data C.

When the binary code contained in the 18-bit word received from the receiver 22, shown in FIG. 1, is not 00, indicating that the received word contains the absolute value of two of the three data sources, the demultiplexer 190 identifies, from the binary code, which absolute data values were received and transfers them directly to the receiver data latches 204, 206 or 208 as required. For example, if the binary code contained in the most significant bit positions (bits 18 and 17) of the received 18-bit word is 01, indicating that the absolute values of the data $A_{t+1}$ and $B_{t+1}$ are contained in the received word, the demultiplexer 190 transfers the absolute value of data $A_{t+1}$ to the receiver data latch 204, where it is stored as the current value of data A, and transfers the 8-bit absolute value of data $B_{t+1}$ to the receiver data latch 206, where it is stored as the current value of data B. When the binary code is 10, the demultiplexer 190 transfers the 8-bit absolute value of data $A_{t+1}$ to the receiver data latch 204, where it is stored, and transfers the 8-bit absolute Value of data $C_{t+1}$ to the receiver data latch 208. When the binary code is 11, the demultiplexer 190 transfers the 8-bit absolute value of data $B_{t+1}$ to the receiver data latch 206 and transfers the 8-bit absolute value of data $C_{t+1}$ to the receiver data latch 208, where it is stored.

The receiver data latches 204, 206 and 208 always store the most current values of data A, B, and C. These values may be the 8-bit absolute values of the data contained in the 18-bit words or the absolute values generated from compressed data.

While the best mode for carrying out the invention has been described in detail, those familiar with the art to which this invention relates will recognize various alternative designs and embodiments for practicing the invention as disclosed by the following claims.

What is claimed is:

1. A multiformat data compression apparatus for a data transmission system having a transmitter at a remote site for transmitting compressed data output by the multiformat data compression apparatus to a base site, the multiformat data compression apparatus having an analog video data input to receive from a video detector an electrical video signal representative of a video image, having an audio data input to receive from an audio detector an electrical audio signal representative of detected sound, and comprising:

transform data compression means for receiving and processing video data to provide in response thereto a compressed video data output signal;

delta modulation means for receiving and processing audio data to provide in response thereto a modulated audio data output signal; and multichannel data compression means for receiving and processing data signals from a plurality of data sources including the transform data compression means and the delta modulation means to provide in response thereto a compressed composite data output signal for transmission by the transmitter to the base site.

2. The multiformat data compression apparatus defined by claim 1, the plurality of data sources further including delta-sigma modulation means for receiving and processing digital data to provide a modulated digital data output signal input to the multichannel data compression means.

3. The multiformat data compression apparatus defined by claim z, wherein the transform data compression means comprises:
   transform means for mathematically transforming the electrical video signal to generate electrical representations of transform coefficients; and
   data compression means for eliminating a portion of the electrical representations of the transform coefficients to reduce the effective size, as represented by the number of the transform coefficients, of the transformed video image.

4. The multiformat data compression apparatus defined by claim 3, wherein the transform means comprises:
   an analog-to-digital converter connected to the analog video data input to convert analog video signals to corresponding digital video signals;
   a digital switch having an input connected to the analog-to-digital converter to receive the digital video signals and also having first and second outputs;
   a first frame buffer connected to the first output of the digital switch to receive and store digital representations of picture elements detected by the video detector and arranged in rows and columns of a first video image frame;
   a second frame buffer connected to the second output of the digital switch to receive and store a digital representation of picture elements detected by the video detector and arranged in rows and columns of a second video image frame;
   a frame buffer multiplexer having a first input connected to the first frame buffer to receive the digital representation of the first video image frame stored by the first frame buffer, having a second input connected to the second frame buffer to receive the digital representation of the second video image frame stored by the second frame buffer, and having an output;
   a transform apparatus connected to the frame buffer multiplexer output to receive digital representations of the first and second video image frames and perform a two-dimensional, mathematical transform upon them to generate in response thereto transform coefficients; and
   a transfer frame storage matrix connected to the transform apparatus to receive and store the transform coefficients.

5. The multiformat data compression apparatus defined by claim 4, wherein the transform apparatus comprises:
   a row pixel counter connected to the output of the frame buffer multiplexer to register the number of picture elements in each row of a video image frame;
   a first vector signal processor connected to the row pixel counter to perform a mathematical transform of the electrical video signal representing the picture elements in each row of a video image frame and to generate electrical representations of resulting transform coefficients;
   a second vector signal processor to perform a mathematical transform of the electrical video signal representing the picture elements in each column of a video image frame and to generate electrical representations of resulting transform coefficients;
   a pixel storage device for temporarily storing the electrical representations of picture elements associated with transform operations; and
   a transform controller electrically connected to the pixel storage device and to the first and second vector signal processors to control the transformation of the electrical video signal representing the picture elements of each video image frame.

6. The multiformat data compression apparatus defined by claim 5, wherein the data compression means comprises a transform coefficient selection device to select, according to specific threshold criteria, only the electrical representations of those of the transform coefficients for transmission that are required to generate a functionally acceptable reproduction of the electrical video signal.

7. The multiformat data compression apparatus defined by claim 6, further including a control circuit electrically connected to the analog-to-digital converter, the digital switch, the multiplexer, the transform apparatus, and the transform coefficient selection device.

8. The multiformat data compression apparatus defined by claim 3, wherein the mathematical transform performed on the digital video signal is a Fourier Transform.

9. The multiformat data compression apparatus defined by claim 2, wherein the delta modulation means is a delta modulation data modulator comprising:
   a delta modulation pulse generator to generate clock pulses;
   a delta modulation pulse modulator connected to the delta modulation pulse generator to receive the clock pulses, to generate positive output pulses in response thereto whenever the sign of a difference signal also received by the delta modulation pulse modulator is positive, and to generate negative output pulses whenever the sign of the difference signal received is negative;
   a delta modulation integrating network connected to the delta modulation pulse modulator to receive output pulses therefrom and to generate a synthesized signal in response thereto; and
   a delta modulation comparator connected to the audio data input to receive the electrical audio signal from the audio detector and connected to the delta modulation integrating network to receive the synthesized signal therefrom, the delta modulation comparator comparing the electrical audio signal with the synthesized signal and generating the difference signal input to the delta modulation pulse modulator in response thereto.

10. The multiformat data compression apparatus defined by claim 2, wherein the delta-sigma modulation means is a delta-sigma modulation data modulator comprising:

a delta-sigma modulation pulse generator to generate clock pulses;

a delta-sigma modulation pulse modulator connected to the delta-sigma modulation pulse generator to receive the clock pulses, to generate positive output pulses in response thereto whenever the sign of an integrated difference signal also received by the delta modulation pulse modulator is positive, the integrated difference signal being positive when it is greater than a predetermined pulse modulator reference level, and to generate no output pulses whenever the sign of the integrated difference signal received is negative;

a sigma-delta modulation comparator connected to the digital data input to receive digital data and connected to the delta-sigma modulation pulse modulator to receive output pulses therefrom, the delta-sigma modulation comparator comparing the digital data with the output pulses and generating a difference signal in response thereto; and a delta-sigma modulation integrating network connected to the sigma-delta modulation comparator to receive the difference signal and generate the integrated difference signal input to the delta-sigma modulation pulse modulator in response thereto.

11. The multiformat data compression apparatus defined by claim 2, wherein the multichannel data compression means comprises:

a plurality of difference means, one associated with each data source, each difference means subtracting sequentially generated data values generated by its associated data source, to generate difference data values;

summing means for summing the difference data values generated by the plurality of difference means in a plurality of different sequences to generate a plurality of composite data values; and multiplexer means connected to the transmitter for multiplexing the composite data values in a predetermined format to generate a compressed data word for transmission by the transmitter.

12. The multiformat data compression apparatus defined by claim 11, wherein each of the difference means comprises:

a data value latch for temporarily storing each data value generated by its associated data source; and a difference amplifier for subtracting the data value stored in the data value latch from the next sequentially generated data value generated by the associated data source to generate the difference data values.

13. The multiformat data compression apparatus defined by claim 12, Wherein the means for summing comprises:

a plurality of sum amplifiers, each of the sum amplifiers summing the difference data values generated by the plurality of difference means in a predetermined sequence to generate the composite data value, each of the sum amplifiers summing the difference data values in a different predetermined sequence to generate a different composite data value; and a composite data latch connected to the multiplexer means for temporarily storing each of the composite data values for transmission by the transmitter.

14. The multiformat data compression apparatus defined by claim 13, further having a selector switch interposed between the composite data latch and the multiplexer means, the selector switch receiving the data values generated at each of the data sources and connected to the composite data latch, the selector switch responsive to the magnitude of each of the composite data values to transfer the composite data values to the multiplexer means when the magnitude of all of the composite data values are less than a predetermined value, and for transferring selected data values received from the data sources to the multiplexer means when at least one of the composite data values exceeds the predetermined value.

15. The multiformat data compression apparatus defined by claim 11, Wherein the plurality of data sources comprises:

a first data source repetitively generating a data value A:

a second data source repetitively generating a data value B; and a third data source repetitively generating a data value C, and wherein the plurality of difference means comprises:

a first difference means for subtracting from each newly generated data value A the previously generated data value A to generate a difference data value delta A for each newly generated value of data value A;

a second difference means for subtracting from each newly generated data value B the previously generated data value B to generate a difference data value delta B for each newly generated value of data value B; and a third difference means for subtracting from each newly generated data value C the previously generated data value C to generate a difference data value delta C for each newly generated value of data value C.

16. The multiformat data compression apparatus defined by claim 15, wherein the summing means comprises:

a first sum amplifier for summing the difference data values delta A, delta B and delta C to generate a first composite data value D where composite data value D = delta A + delta B − delta C;

a second sum amplifier for summing the difference data values delta A, delta B and delta C to generate a second composite data value E where composite data value E = delta A − delta B + delta C; and a third sum amplifier for summing the difference data values delta A, delta B and delta C to generate a third composite data value F where composite data value F = delta B + delta C − delta A.

17. The multiformat data compression apparatus defined by claim 16, wherein the summing means has a composite data latch for temporarily storing the composite data D, the composite data E and the composite data F.

18. The multiformat data compression apparatus defined by claim 17, further having a selector switch interposed the composite data latch and the multiplexer, the selector switch receiving directly the data values A, B and C generated by the first, second and third data sources, respectively, and the composite data values D, E and F stored in the composite data value latch, the selector switch responsive to the magnitude of each of the composite data values D, E and F, to transfer the composite data values D, E and F to the multiplexer means when the magnitude of each of the composite data values is less than a predetermined value and for transferring selected ones of the data values A, B and C to the multiplexer means when at least one of the composite data values D, E or F exceeds the predetermined value, the selector switch further having means for transmitting a binary code to the multiplexer means identifying the data values being transferred.

19. The multiformat data compression apparatus defined by claim 18, wherein the predetermined value of the composite data values is a predetermined number of bits.

20. The multiformat data compression apparatus defined by claim 19, wherein the predetermined number of bits is 5.

21. The multiformat data compression apparatus defined by claim 20, wherein each transmission by the transmitter is an 18-bit word, the 18-bit word comprises a 2-bit binary code identifying the type of data being sent.

22. The multiformat data compression apparatus defined by claim 21, wherein the 2-bit binary code identifies that the transmitted word contains compressed data, bit positions 16 through 2 of the transmitted word contain the composite data values D, E and F.

23. The multiformat data compression apparatus defined by claim 21, wherein the 2-bit binary code identifies that the transmitted word contains data values, bit positions 16 through 9 contain a first selected one of the data values A, B and C and bit positions 8 through 1 contain a second selected one of the data values A, B and C.

24. The multiformat data compression apparatus defined by claim 18, wherein the selector switch has a logic circuit for selecting the data values to be transferred to the multiplexer in response to detecting which of the composite data values D, E and F exceeds the predetermined value.

25. A multiformat data decompression apparatus for a data receiving system having a receiver at a base site for receiving from a remote site transmissions containing compressed data from a plurality of data sources, the compressed data containing a plurality of composite data values, the multiformat data decompression apparatus comprising:
   multichannel data decompression means for receiving and processing compressed, composite video and audio data to provide in response thereto decompressed video and audio data;
   transform data decompression means for receiving from the multichannel data decompression means processed video data to provide in response thereto decompressed video data; and
   delta demodulation means for receiving from the multichannel data decompression means decompressed audio data to provide in response thereto integrated, filtered audio data.

26. The multiformat data decompression apparatus defined by claim 25, wherein the multichannel data decompression means further provides decompressed digital data in response to receiving compressed digital data, the multiformat data decompression apparatus further including delta-sigma demodulation means for receiving from the multichannel data decompression means decompressed digital data to provide in response thereto filtered digital data.

27. The multiformat data decompression apparatus defined by claim 26, wherein the multichannel data decompression means comprises:

a demultiplexer connected to the receiver for demultiplexing the compressed data to output, individually, each of the composite data values contained in each compressed data transmission;
a plurality of sum amplifiers, each sum amplifier summing at least two different composite data values to generate a correction data value for a respective one of a plurality of data values;
a plurality of data value latches each storing a respective one of the data values; and
a plurality of adders, one associated with a respective one data value latch and the sum amplifier that generates a correction data value for the data value stored in the respective one data value latch for summing the correction data value with the data value to generate an updated data value.

28. The multiformat data decompression apparatus defined by claim 27, wherein the plurality of composite data values is three composite data values, identified as composite data value D, composite data value E and composite data value F, the plurality of sum amplifiers comprises:
   a first sum amplifier summing composite data value D with composite data value E to generate a correction data value delta a;
   a second sum amplifier summing composite data value D with composite data value F to generate a correction data value delta b; and
   a third sum amplifier summing composite data value E with composite data value F to generate a correction data value delta c.

29. The multiformat data decompression apparatus defined by claim bs, wherein plurality of data value latches comprises:
   a first data value latch storing an absolute data value of a data A;
   a second data value latch storing an absolute data value of a data B; and
   a third data value latch storing an absolute data value of a data C;
   wherein the plurality of adders comprises:
   a first adder for adding the correction value delta a received from the first sum amplifier with the value of data A stored in the first latch to generate a new data value for data A, the new data value for data A being stored in the first data value latch as data A;
   a second adder for adding the correction value delta b received from the second sum amplifier with the value of data B stored in the second data value latch to generate a new value for data B, the new value for data B being stored in the second data value latch as data B; and
   a third adder for adding the correction value delta c received from the third sum amplifier with the value of data C stored in the third data value latch to generate a new value for data value C, the new value for data value C being stored in the second data value latch as data C.

30. The multiformat data decompression apparatus defined by claim 26, wherein the plurality of composite data values includes a reduced number of transform coefficients of a transformed electrical video signal depicting a video image, the transform data decompression means comprising:
   scaling means for decompressing the data representing the transform coefficients to restore the original number thereof and restore the effective size of the video image as represented by the number of transform coefficients;

inverse transform means for inversely mathematically transforming the decompressed representations of the transform coefficients to generate a functionally acceptable reproduction of the electrical video signal; and an inverse threshold selection device that compares the values of the reproduction of the electrical video signal with a selected threshold value and sets all values below the threshold value to zero and all values equal to or greater than the threshold value to one.

31. The multiformat data decompression apparatus defined by claim 30, wherein the scaling means comprises a filter to insert electrical representations of a predetermined value between certain electrical representations of the transform coefficients to reestablish the original number thereof.

32. The multiformat data decompression apparatus defined by claim 31, further comprising a receiver frame storage matrix to receive and store in cells thereof the transform coefficients received by the data receiver.

33. The multiformat data decompression apparatus defined by claim 32, further comprising an inverse transform frame storage matrix to receive and store in cells thereof the reproduction of the electrical video signal generated by the inverse transform means.

34. The multiformat data decompression apparatus defined by claim 33, further comprising a digital-to-analog converter to convert a signal representative of the data thresholded by the inverse threshold selection device from a digital signal to a corresponding analog signal.

35. The multiformat data decompression apparatus defined by claim 34, further comprising image processing means for processing the reproduction of the electrical video signal to identify specific objects of the video image.

36. The multiformat data decompression apparatus defined by claim 26, wherein the delta demodulation means is a delta modulation data demodulator comprising:

an integrating network to receive from the multichannel data decompression means decompressed audio data to provide in response thereto demodulated audio data; and a low-pass filter to receive the integrated audio data and provide in response thereto relatively noise-free audio data.

37. The multiformat data decompression apparatus defined by claim 26, wherein the delta-sigma demodulation means is a delta modulation data demodulator comprising a low-pass filter to receive from the multichannel data decompression means decompressed digital data to provide in response thereto demodulated, filtered digital data.

38. A multiformat data compressing apparatus for a data communication system having a transmitter at a remote site for transmitting compressed data output by the multiformat data compression apparatus to a base site, the multiformat data compression apparatus having an analog video data input to receive from a video detector an electrical video signal representative of a video image and having an audio data input to receive from an audio detector an electrical audio signal representative of detected sound, the data communication system further having a receiver at a base site for receiving from the remote site transmissions containing compressed data from a plurality of data sources, the compressed data containing a plurality of composite data values, the multiformat data compression apparatus comprising:

transform data compression means for receiving and processing video data to provide in response thereto a compressed video data output signal;

delta modulation means for receiving and processing audio data to provide in response thereto a modulated audio data output signal;

multichannel data compression means for receiving and processing data signals from a plurality of data sources including the transform data compression means and the delta modulation means to provide in response thereto a compressed composite data output signal for transmission by the transmitter to the base site;

multichannel data decompression means for receiving and processing compressed, composite video and audio data to provide in response thereto decompressed video and audio data;

transform data decompression means for receiving from the multichannel data decompression means processed video data to provide in response thereto decompressed video data; and delta demodulation means for receiving from the multichannel data decompression means decompressed audio data to provide in response thereto demodulated, filtered audio data.

39. The multiformat data compressing apparatus defined by claim 38, wherein:

the plurality of data sources further includes delta-sigma modulation means for receiving and processing digital data to provide a modulated digital data output signal input to the multichannel data compression means; and the multichannel data decompression means further provides decompressed digital data in response to receiving compressed digital data, the multiformat data compressing apparatus further including delta-sigma demodulation means for receiving from the multichannel data decompression means decompressed digital data to provide in response thereto filtered digital data.

40. The multiformat data compressing apparatus defined by claim 39, wherein the transform data compression means comprises:

transform means for mathematically transforming the electrical video signal to generate electrical representations of transform coefficients; and data compression means for eliminating a portion of the electrical representations of the transform coefficients to reduce the effective size, as represented by the number of the transform coefficients, of the transformed video image.

41. The multiformat data compressing apparatus defined by claim 40, wherein the transform means comprises:

an analog-to-digital converter connected to the analog video data input to convert analog video signals to corresponding digital video signals;

a digital switch having an input connected to the analog-to-digital converter to receive the digital video signals and also having first and second outputs;

a first frame buffer connected to the first output of the digital switch to receive and store digital representations of picture elements detected by the video detector and arranged in rows and columns of a first video image frame;

a second frame buffer connected to the second output of the digital switch to receive and store a digital representation of picture elements detected by the video detector and arranged in rows and columns of a second video image frame;

a frame buffer multiplexer having a first input connected to the first frame buffer to receive the digital representation of the first video image frame stored by the first frame buffer, having a second input connected to the second frame buffer to receive the digital representation of the second video image frame stored by the second frame buffer, and having an output;

a transform apparatus connected to the frame buffer multiplexer output to receive digital representations of the first and second video image frames and perform a two-dimensional, mathematical transform upon them to generate in response thereto transform coefficients; and a transfer frame storage matrix connected to the transform apparatus to receive and store the transform coefficients.

42. The multiformat data compressing apparatus defined by claim 41, wherein the transform apparatus comprises:

a row pixel counter connected to the output of the frame buffer multiplexer to register the number of picture elements in each row of a video image frame;

a first vector signal processor connected to the row pixel counter to perform a mathematical transform of the electrical video signal representing the picture elements in each row of a video image frame and to generate electrical representations of resulting transform coefficients;

a second vector signal processor to perform a mathematical transform of the electrical video signal representing the picture elements in each column of a video image frame and to generate electrical representations of resulting transform coefficients;

a pixel storage device for temporarily storing the electrical representations of picture elements associated with transform operations; and a transform controller electrically connected to the pixel storage device and to the first and second vector signal processors to control the transformation of the electrical video signal representing the picture elements of each video image frame.

43. The multiformat data compressing apparatus defined by claim 42, wherein the data compression means comprises a transform coefficient selection device to select, according to specific threshold criteria, only the electrical representations of those of the transform coefficients for transmission that are required to generate a functionally acceptable reproduction of the electrical video signal.

44. The multiformat data compressing apparatus defined by claim 43, further including a control circuit electrically connected to the analog-to-digital converter, the digital switch, the multiplexer, the transform apparatus, and the transform coefficient selection device.

45. The multiformat data compressing apparatus defined by claim 40, wherein the mathematical transform performed on the digital video signal is a Fourier Transform.

46. The multiformat data compressing apparatus defined by claim 39, wherein the data modulation means is a delta modulation data modulator comprising:

a delta modulation pulse generator to generate clock pulses;

a delta modulation pulse modulator connected to the delta modulation pulse generator to receive the clock pulses, to generate positive output pulses in response thereto whenever the sign of a difference signal also received by the delta modulation pulse modulator is positive, and to generate negative output pulses whenever the sign of the difference signal received is negative;

a delta modulation integrating network connected to the delta modulation pulse modulator to receive output pulses therefrom and to generate a synthesized signal in response thereto; and a delta modulation comparator connected to the audio data input to receive the electrical audio signal from the audio detector and connected to the delta modulation integrating network to receive the synthesized signal therefrom, the delta modulation comparator comparing the electrical audio signal with the synthesized signal and generating the difference signal input to the delta modulation pulse modulator in response thereto.

47. The multiformat data compression apparatus defined by claim 39, wherein the delta-sigma modulation means is a delta-sigma modulation data modulator comprising:

a delta-sigma modulation pulse generator to generate clock pulses;

a delta-sigma modulation pulse modulator connected to the delta-sigma modulation pulse generator to receive the clock pulses, to generate positive output pulses in response thereto whenever the sign of an integrated difference signal also received by the delta modulation pulse modulator is positive, the integrated difference signal being positive when it is greater than a predetermined pulse modulator reference level, and to generate no output pulses whenever the sign of the integrated difference signal received is negative;

a sigma-delta modulation comparator connected to the digital data input to receive digital data and connected to the delta-sigma modulation pulse modulator to receive output pulses therefrom, the delta-sigma modulation comparator comparing the digital data with the output pulses and generating a difference signal in response thereto; and a delta-sigma modulation integrating network connected to the sigma-delta modulation comparator to receive the difference signal and generate the integrated difference signal input to the delta-sigma modulation pulse modulator in response thereto.

48. The multiformat data compressing apparatus defined by claim 39, wherein the multichannel data compression means comprises:

a plurality of difference means, one associated with each data source, each difference means subtracting sequentially generated data values generated by its associated data source, to generate difference data values;

summing means for summing the difference data values generated by the plurality of difference means in a plurality of different sequences to generate a plurality of composite data values; and multiplexer means connected to the transmitter for multiplexing the composite data values in a predetermined format to generate a compressed data word for transmission by the transmitter.

49. The multiformat data compressing apparatus defined by claim 48, wherein the multichannel data decompression means comprises:

demultiplexer means connected to the receiver for demultiplexing the compressed data to regenerate each of the plurality of composite data values;

a plurality of composite data sum amplifiers, each composite data sum amplifier summing at least two different composite data values to generate a correction value, the plurality of sum amplifiers collectively generating a plurality of correction data values corresponding to the plurality of difference data values generated by the multichannel data compressor;

a plurality of data value latches, each storing a data value, each of the data values corresponding to a respective one of the data values generated by the plurality of data sources; and a plurality of adders; one associated with each data value latch and the sum amplifier that generates a correction data value for the data value stored in the associated data value latch, each adder summing the correction data value to the data value stored in the data value latch to generate an updated data value that is stored in its associated data value latch.

50. The multiformat data compressing apparatus defined by claim 49, wherein:

the multichannel data compressor has means responsive to any of the composite data values exceeding a predetermined value to transfer the absolute data value of at least one of the data values to the transmitter for transmission in place of the compressed data word; and the multichannel data decompressor has means responsive to the reception of the absolute value for storing the absolute value in the data value latch storing the data value corresponding to the absolute value.

51. The multiformat data compressing apparatus defined by claim 50, wherein each of the composite data values comprises a maximum number of bits, the predetermined value is a predetermined number of bits equal in number to the maximum number of bits.

52. The multiformat data compressing apparatus defined by claim 51, wherein the maximum number of bits in each of the composite data values is 5 bits, the predetermined value is 5 bits.

53. The multiformat data compressing apparatus defined by claim 51, wherein the plurality of data sources comprises a first data source generating a data value A, a second data source generating a data value B and a third data source generating a data value C, the plurality of difference means comprises a first difference means generating a difference data value delta A, a second difference means generating a difference value delta B, and a third difference means generating a difference data value delta C.

54. The multiformat data compressing apparatus defined by claim 53, wherein each of the first, second and third difference means comprises a data latch for temporarily storing the data value received from its associated data source, and a difference amplifier for subtracting the data value stored in the data latch from the next data value generated by its associated data source to generate the difference data value.

55. The multiformat data compressing apparatus defined by claim 53, wherein the summing means:

a first sum amplifier for summing difference data values delta A, delta B and delta C to produce a first composite data value D, where composite data value D=delta A+delta B−delta C;

a second sum amplifier for summing the difference data values delta A, delta B and delta C to generate a second composite data value E where composite data value E=delta A−delta B+delta C; and a third sum amplifier for summing the difference data value delta A, delta B and delta C to generate a third composite data value F where composite data value F=delta B+delta C−delta A.

56. The multiformat data compressing apparatus defined by claim 55, wherein the multichannel data compressor has a composite data latch for temporarily storing the composite data values D, E and F.

57. The multiformat data compressing apparatus defined by claim 56, wherein the multichannel data compressor has a selector switch interposed the composite data latch and the multiplexer, the selector switch receiving directly from the data sources the data values A, B and C and the composite data values D, E and F stored in the composite data latch and responsive to the magnitude of all of composite data values being less than a predetermined value for transferring the composite data values to the multiplexer means and further responsive to any one of the composite data values exceeding the predetermined value to transfer at least one selected data value to the multiplexer means.

58. The multiformat data compressing apparatus defined by claim 57, wherein the selector switch transfers two selected data values to the multiplexer means in response to at least one of the composite data values exceeding the predetermined value.

59. The multiformat data compressing apparatus defined by claim 58, wherein the composite data values have a maximum number of bits that may be transmitted by the transmitter, the predetermined value is equal to the maximum number of bits.

60. The multiformat data compressing apparatus defined by claim 59, wherein the compressed data word transmitted by the transmitter comprises 18 bits, the predetermined number of bits is 5 bits.

61. The multiformat data compressing apparatus defined by claim 60, wherein the two most significant bits of the 18-bit word transmitted by the transmitter are a binary code identifying the 18-bit word as containing compressed data or absolute data values.

62. The multiformat data compressing apparatus defined by claim 1, wherein the selector switch includes means for selecting the data values to be transferred to the multiplexer means in response to the magnitude of each of the composite data values and means for generating the binary code identifying the data values transferred to the multiplexer.

63. The multiformat data compressing apparatus defined by claim 57, wherein the demultiplexer means demultiplexes the received compressed data word to regenerate the composite data values D, E and F.

64. The multiformat data compressing apparatus defined by claim 63, wherein the plurality of sum amplifiers comprises:

a first composite data sum amplifier for summing the composite data values (D+E)/2 to generate a first correction data value having a value corresponding to difference data value delta A;

a second composite data sum amplifier for summing composite data values (D+F)/2 to generate a second correction data value having a value corresponding to the difference data value delta B; and a third composite data sum amplifier for summing composite data values (E+F)/2 to generate a third correction data value having a value corresponding to the difference data value delta C.

65. The multiformat data compressing apparatus defined by claim 64 wherein the plurality of data latches comprises:
a first receiver data latch storing a current value of data value A;
a second receiver data latch storing a current value of data value B; and
a third receiver data latch storing a current value of data value C.

66. The multiformat data compressing apparatus defined by claim 65, wherein the plurality of adders comprises:
a first adder for adding the first correction data value to the data value A stored in the first receiver data latch to generate a new current value for data value A;
a second adder for adding the second correction data value to the data value B stored in the second receiver data latch to generate a new current value for data value B; and
a third adder for adding the third correction data value to the data value C stored in the third receiver data latch to generate a new current value for data value C.

67. The multiformat data compressing apparatus defined by claim 4o, wherein the transfer data decompression means comprises:
scaling means for decompressing the data representing the transform coefficients to restore the original number thereof and restore the effective size of the video image as represented by the number of transform coefficients;
inverse transform means for inversely mathematically transforming the decompressed representations of the transform coefficients to generate a functionally acceptable reproduction of the electrical video signal; and
an inverse threshold selection device that compares the values of the reproduction of the electrical video signal with a selected threshold value and sets all values below the threshold value to zero and all values equal to or greater than the threshold value to one.

68. The multiformat data compressing apparatus defined by claim 67, wherein the scaling means comprises a filter to insert electrical representations of a predetermined value between certain electrical representations of the transform coefficients to reestablish the original number thereof.

69. The multiformat data compressing apparatus defined by claim 68, further comprising a receiver frame storage matrix to receive and store in cells thereof the transform coefficients received by the data receiver.

70. The multiformat data compressing apparatus defined by claim 69, further comprising an inverse transform frame storage matrix to receive and store in cells thereof the reproduction of the electrical video signal generated by the inverse transform means.

71. The multiformat data compressing apparatus defined by claim 70, further comprising a digital-to-analog converter to convert a signal representative of the data thresholded by the inverse threshold selection device from a digital signal to a corresponding analog signal.

72. The multiformat data compressing apparatus defined by claim 71, further comprising image processing means for processing the reproduction of the electrical video signal to identify specific objects of the video image.

73. The multiformat data compressing apparatus defined by claim 39, wherein the delta demodulation means is a delta modulation data demodulator comprising:
an integrating network to receive from the multichannel data decompression means decompressed audio data to provide in response thereto demodulated audio data; and
a low-pass filter to receive the integrated audio data and provide in response thereto relatively noise-free audio data.

74. The multiformat data compressing apparatus defined by claim 39, wherein the delta-sigma demodulation means is a delta modulation data demodulator comprising a low-pass filter to receive from the multichannel data decompression means decompressed digital data to provide in response thereto demodulated, filtered digital data.

75. The multiformat data compressing apparatus defined by claim 38 or 39, wherein the data communication system further has a transmitter at the base site for transmitting compressed data output by the multiformat data compressing apparatus to a remote site, the multiformat data compressing apparatus further having an audio data input to receive from an audio detector an electrical audio signal representative of detected sound, the data communication system further having a receiver at the remote site for receiving from the base site transmissions containing compressed audio data, the multiformat data compressing apparatus further comprising:
delta modulation means for receiving and processing audio data to provide in response thereto a modulated audio data output signal;
multichannel data compression means for receiving and processing data signals from a plurality of data sources including the delta modulation means to provide in response thereto a compressed data output signal for transmission by the transmitter to the remote site;
multichannel data decompression means for receiving and processing the compressed audio data to provide in response thereto decompressed audio data; and
delta demodulation means for receiving from the multichannel data decompression means decompressed audio data to provide in response thereto demodulated, filtered audio data.

76. In a multiformat data compression apparatus for a data transmission system having a transmitter at a remote site for transmitting compressed data output by the multiformat data compression apparatus to a base site, the multiformat data compression apparatus having an analog video data input to receive from a video detector an electrical video signal representative of a video image and having an audio data input to receive from an audio detector an electrical audio signal representative of detected sound, a method for compressing data, the method comprising the steps of:

mathematically transforming the electrical video signal to generate electrical representations of transform coefficients; selecting, according to specific threshold criteria, only the electrical representations of those of the transform coefficients for transmission that are required to generate a functionally acceptable reproduction of the electrical video signal, thereby reducing the effective size, as represented by the number of the transform coefficients, of the video image;

modulating the electrical audio signal to produce a modulated audio data output signal; and compressing the selected electrical representations of the transform coefficients and the modulated audio data output signal to produce a compressed composite data output signal for transmission by the transmitter.

77. The method defined by claim 76, wherein the multiformat data compression apparatus further has a digital data input to receive digital data, the method further comprising the steps of:

modulating the electrical digital signal to produce a modulated digital data output signal; and compressing the modulated digital data output signal with the selected electrical representations of the transform coefficients and the modulated audio data output signal to produce a compressed composite data output signal for transmission by the transmitter.

78. The method defined by claim 77, wherein the electrical video signal is mathematically transformed using a Fourier Transform.

79. The method as defined by claim 77, wherein the electrical audio signal is modulated using a delta modulation data modulator.

80. The method as defined by claim 77, wherein the electrical digital signal is modulated using a delta-sigma modulation data modulator.

81. The method as defined by claim 77, wherein data values representing a transformed electrical video signal, a modulated audio data output signal, and a modulated digital data output signal are compressed by the steps of:

subtracting from each data value representing each signal the preceding data value representing that signal to generate a plurality of difference data values, one difference data value for each signal;

summing the plurality of difference data values in a plurality of different predetermined sequences to generate a plurality of composite data values; and multiplexing, with a multiplexer, the composite data values to generate a compressed data word for transmission by the transmitter.

82. The method as defined by claim 81, wherein the step of subtracting comprises the steps of:

storing for one data cycle, in a data value latch, the data value representing each signal; and subtracting the data value stored in the data value latch from the next data value representing the same signal to generate the difference data values.

83. The method as defined by claim 82, further including the step of temporarily storing the plurality of difference data in a difference data latch.

84. The method as defined by claim 82, further including the steps of:

comparing the magnitude of each of the composite data values to determine if any one of the composite data values is greater than a predetermined value;

transferring the composite data values to the multiplexer in response to the magnitude of all the composite data values being less than the predetermined value; and transferring selected data values representing the signals to the multiplexer in response to at least one of the composite data values exceeding the predetermined value.

85. In a multiformat data decompression apparatus for a data receiving system having a receiver at a base site for receiving a compressed composite data signal from a multiformat data compression apparatus at a remote site, the multiformat data decompression apparatus having an analog video data output and an audio data output, a method for decompressing data, the method comprising the steps of:

decompressing the compressed composite data signal received from the remote site by the receiver;

scaling electrical representations of transform coefficients included in the compressed composite data signal received to restore their original number prior to being reduced by the multiformat data compression apparatus at the remote site;

inversely mathematically transforming the transform coefficients to generate a functionally acceptable reproduction of an associated original electrical video signal input to the multiformat data compression apparatus at the remote site; and demodulating a modulated audio data signal included in the compression composite data signal to generate a functionally acceptable reproduction of an associated original electrical audio signal input to the multiformat data compression apparatus at the remote site.

86. The method as defined by claim 85, wherein the multiformat data decompression apparatus further has a digital data output, the method further comprising the step of:

decompressing a compressed digital data signal included in the compressed composite data signal to generate a decompressed digital data signal; and demodulating a modulated digital data signal included in the compressed composite data signal to generate a functionally acceptable reproduction of an associated original electrical digital signal input to the multiformat data compression apparatus at the remote site.

87. The method as defined by claim 86, wherein the step of decompressing the compressed composite data signal received from the remote site by the receiver comprising the steps of:

demultiplexing received compressed data to reconstruct the plurality of composite data values;

selectively summing, in each of a plurality of summing circuits, two different composite data values to generate a plurality of correction data values, one associated with the data value representing each signal.

summing each correction data value to an associated current data value to generate a plurality of new current data values, one for each data value; and storing each new current data value in individual data latches as a current data value.

88. The method as defined by claim 87, wherein the step of scaling electrical representations of transform coefficients comprises the filtering thereof to insert electrical representations of a predetermined value therebetween to reestablish the original number of electrical representations of transform coefficients prior to their having been reduced by the multiformat data compression apparatus at the remote site.

89. The method as defined by claim 88, wherein the step of demodulating a modulated audio data signal comprises the steps of:
- integrating the modulated audio data signal to generate demodulated audio data in response thereto; and
- filtering the integrated audio data to generate in response thereto relatively noise-free audio data.

90. The method as defined by claim 89, wherein the step of demodulating a modulated digital data signal comprises filtering the modulated digital data signal to generate in response thereto demodulated, filtered digital data.

91. In a multiformat data compressing apparatus for a data communication system having a transmitter at a remote site for transmitting compressed data output by the multiformat data compressing apparatus to a base site, the multiformat data compressing apparatus having an analog video data input to receive from a video detector an electrical video signal representative of a video image and having an audio data input to receive from an audio detector an electrical audio signal representative of detected sound, the data communication system further having a receiver at a base site for receiving from the remote site transmissions containing compressed data from a plurality of data sources, the compressed data containing a plurality of composite data values, a method for compressing and decompressing data, the method comprising the steps of:
- mathematically transforming the electrical video signal to generate electrical representations of transform coefficients;
- selecting, according to specific threshold criteria, only the electrical representations of transform coefficients;
- selecting, according to specific threshold criteria, only the electrical representations of those of the transform coefficients for transmission that are required to generate a functionally acceptable reproduction of the electrical video signal, thereby reducing the effective size, as represented by the number of the transform coefficients, of the video image;
- modulating the electrical audio signal to produce a modulated audio data output signal;
- compressing the selected electrical representations of the transform coefficients and the modulated audio data output signal to produce a compressed composite data output signal for transmission by the transmitter;
- decompressing the compressed composite data signal received from the remote site by the receiver;
- scaling electrical representations of transform coefficients included in the compressed composite data signal received to restore their original number prior to being reduced by the multiformat data compressing apparatus at the remote site;
- inversely mathematically transforming the transform coefficients to generate a functionally acceptable reproduction of an associated original electrical video signal input to the multiformat data compressing apparatus at the remote site; and
- demodulating a modulated audio data signal included in the compressed composite data signal to generate a functionally acceptable reproduction of an associated original electrical audio signal input to the multiformat data compressing apparatus at the remote site.

92. The method as defined by claim 91, wherein the multiformat data compressing apparatus further has a digital data input to receive digital data and a digital data output, the method further comprising the steps of:
- modulating the electrical digital signal to produce a modulated digital data output signal;
- compressing the modulated digital data output signal with the selected electrical representations of the transform coefficients and the modulated audio data output signal to produce a compressed composite data output signal for transmission by the transmitter;
- decompressing the compressed digital data signal included in the compressed composite data signal to generate a decompressed digital data signal; and
- demodulating a modulated digital data signal included in the compressed composite data signal to generate a functionally acceptable reproduction of an associated original electrical digital signal input to the multiformat data compression apparatus at the remote site.

* * * * *